(12) United States Patent
Zhao

(10) Patent No.: US 10,992,509 B2
(45) Date of Patent: Apr. 27, 2021

(54) RESOURCE CONFIGURATION METHOD, TERMINAL DEVICE, AND BASE STATION

(71) Applicant: HUAWEI TECHNOLOGIES CO., LTD., Shenzhen (CN)

(72) Inventor: Zhenshan Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 116 days.

(21) Appl. No.: 16/403,537

(22) Filed: May 4, 2019

(65) Prior Publication Data

US 2019/0260627 A1    Aug. 22, 2019

Related U.S. Application Data

(63) Continuation of application No. PCT/CN2016/104750, filed on Nov. 4, 2016.

(51) Int. Cl.
*H04L 27/26* (2006.01)
*H04W 4/70* (2018.01)
(Continued)

(52) U.S. Cl.
CPC ........ *H04L 27/2656* (2013.01); *H04L 5/1469* (2013.01); *H04W 4/40* (2018.02);
(Continued)

(58) Field of Classification Search
CPC ....... H04W 4/40; H04W 56/001; H04W 4/70; H04W 72/0406; H04W 72/042;
(Continued)

(56) References Cited

U.S. PATENT DOCUMENTS

| 2009/0046641 A1* | 2/2009 | Wang | H04W 74/0866 |
| | | | 370/329 |
| 2010/0238845 A1* | 9/2010 | Love | H04W 72/1263 |
| | | | 370/280 |

(Continued)

FOREIGN PATENT DOCUMENTS

| CN | 103874206 A | 6/2014 |
| CN | 104244413 A | 12/2014 |

(Continued)

OTHER PUBLICATIONS

Ericsson: "Pool design for V2V", 3GPP TSG RAN WG1 Meeting #86bis, R1-1609726, Lisboa, Portugal, Oct. 10-14, 2016, total 3 pages, XP051149760.

(Continued)

*Primary Examiner* — Mewale A Ambaye
(74) *Attorney, Agent, or Firm* — Kilpatrick Townsend & Stockton LLP

(57) ABSTRACT

Embodiments of the present invention relate to a resource configuration method, a terminal device, and a base station, the embodiments are applicable for V2X. The method includes: obtaining, by a terminal device, at least one of configuration information of a first resource, configuration information of at least one set of synchronization resources, time domain period information, bitmap information, configuration information of a reserved resource, and configuration information of a time division duplex TDD system; and performing, by the terminal device, the D2D data transmission based on the bitmap information and the second resource. The terminal device may determine the quantity of reserved subframes and the time domain location of the reserved subframe based on information sent by a base station or preconfigured information, and further accurately (Continued)

perform the D2D data transmission by using the second resource based on the bitmap information.

20 Claims, 7 Drawing Sheets

(51) Int. Cl.
| | |
|---|---|
| *H04W 4/40* | (2018.01) |
| *H04L 5/14* | (2006.01) |
| *H04W 56/00* | (2009.01) |
| *H04W 72/04* | (2009.01) |
| *H04W 72/12* | (2009.01) |
| *H04W 76/14* | (2018.01) |

(52) U.S. Cl.
CPC ............ *H04W 4/70* (2018.02); *H04W 56/001* (2013.01); *H04W 72/0406* (2013.01); *H04W 72/0446* (2013.01); *H04W 72/1263* (2013.01); *H04W 76/14* (2018.02); *H04W 72/042* (2013.01)

(58) Field of Classification Search
CPC ............ H04W 72/1263; H04W 76/14; H04W 5/1469; H04W 27/2656; H04L 27/2613; H04L 27/2662
See application file for complete search history.

(56) References Cited

U.S. PATENT DOCUMENTS

| | | | | |
|---|---|---|---|---|
| 2015/0271800 | A1* | 9/2015 | Panteleev | H04W 72/042 370/329 |
| 2016/0128047 | A1* | 5/2016 | Yang | H04W 72/0406 370/329 |
| 2016/0183167 | A1 | 6/2016 | Agiwal et al. | |
| 2016/0353499 | A1* | 12/2016 | Takano | H04L 5/14 |
| 2017/0034822 | A1 | 2/2017 | Chae et al. | |
| 2017/0230165 | A1 | 8/2017 | Yang et al. | |
| 2019/0045345 | A1* | 2/2019 | Lee | H04L 5/0048 |
| 2020/0052966 | A1* | 2/2020 | Yang | H04W 4/70 |
| 2020/0059971 | A1* | 2/2020 | Qian | H04W 4/18 |

FOREIGN PATENT DOCUMENTS

| | | |
|---|---|---|
| CN | 105474726 A | 4/2016 |
| CN | 105515721 A | 4/2016 |
| EP | 3043612 A1 | 7/2016 |
| WO | 2015156605 A1 | 10/2015 |
| WO | 2015169359 A1 | 11/2015 |

OTHER PUBLICATIONS

Ericsson,"Pool design for V2V",3GPP TSG RAN WG1 Meeting #86 R1-166974,Göteborg, Sweden, Aug. 22-26, 2016,total 3 pages.
3GPP TS 36.331 V14.0.0 (Sep. 2016);3rd Generation Partnership Project;Technical Specification Group Radio Access Network;Evolved Universal Terrestrial Radio Access (E-UTRA);Radio Resource Control (RRC);Protocol specification (Release 14);total 644 pages.
3GPP TS 36.213 V14.0.0 (Sep. 2016);3rd Generation Partnership Project;Technical Specification Group Radio Access Network;Evolved Universal Terrestrial Radio Access (E-UTRA);Physical layer procedures(Release 14);total 406 pages.

* cited by examiner

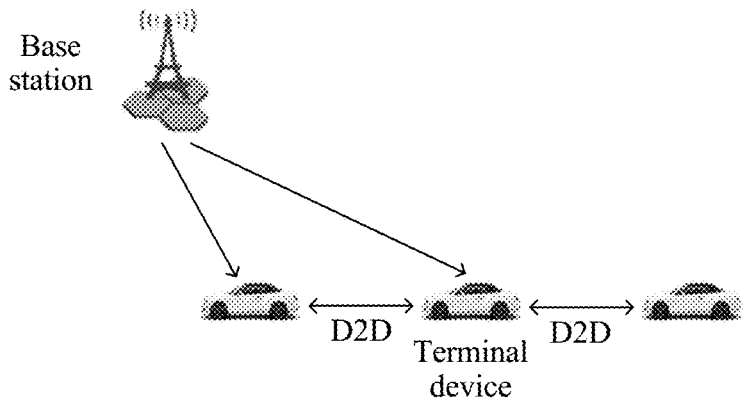

FIG. 3

```
┌─────────────────────────────────────────────────────────┐
│ A terminal device obtains at least one of configuration  │
│ information of a first resource, configuration           │ S101
│ information of at least one set of synchronization       │
│ resources, time domain period information, bitmap        │
│ information, configuration information of a reserved    │
│ resource, and configuration information of a TDD system │
└─────────────────────────────────────────────────────────┘
                            ↓
┌─────────────────────────────────────────────────────────┐
│ The terminal device determines a quantity of reserved    │
│ subframes in the first resource and a time domain       │
│ location of the reserved subframe in the first resource │ S102
│ based on the at least one of the configuration          │
│ information of the first resource, the configuration    │
│ information of the at least one set of synchronization  │
│ resources, the time domain period information, the      │
│ bitmap information, the configuration information of    │
│ the reserved resource, and the configuration             │
│ information of the TDD system                            │
└─────────────────────────────────────────────────────────┘
                            ↓
┌─────────────────────────────────────────────────────────┐
│ The terminal device determines a second resource based   │
│ on at least one of the configuration information of the │ S103
│ first resource, the configuration information of the   │
│ at least one set of synchronization resources, the      │
│ configuration information of the TDD system, the        │
│ quantity information of reserved subframes, and the     │
│ time domain location information of the reserved        │
│ subframe in the first resource                           │
└─────────────────────────────────────────────────────────┘
                            ↓
┌─────────────────────────────────────────────────────────┐
│ The terminal device performs D2D data transmission       │ S104
│ based on the bitmap information and the second resource │
└─────────────────────────────────────────────────────────┘
```

RESOURCE CONFIGURATION METHOD, TERMINAL DEVICE, AND BASE STATION

CROSS-REFERENCE TO RELATED APPLICATIONS

This application is a continuation of International Application No. PCT/CN2016/104750, filed on Nov. 4, 2016, the disclosure of which is hereby incorporated by reference in its entirety.

TECHNICAL FIELD

The present invention relates to the field of communications technologies, and in particular, to a resource configuration method, a terminal device, and a base station.

BACKGROUND

In recent years, people pay more attention to the Internet of Vehicles. Road traffic safety and reliability are improved and traffic efficiency is enhanced through vehicle-to-vehicle communication or communication between a vehicle and a roadside unit. An Intelligent Transportation System (ITS) includes Internet of Vehicles technologies such as vehicle-to-vehicle communication and vehicle-to-road communication. A transmission technology used in the ITS includes a Long Term Evolution-Vehicle (LTE-V) transmission technology. The LTE-V usually uses a device-to-device (D2D) communication mode.

As shown in FIG. 1, there are two scenarios for vehicle-to-vehicle communication in an LTE-V system: in coverage (IC) and out of coverage (OOC). In an OOC scenario, a Global Navigation Satellite System (GNSS) is used as an LTE-V synchronization source. In an IC scenario, a base station or a GNSS is used as an LTE-V synchronization source. In addition, a terminal device may also be used as a synchronization source. In the IC or OOC scenario, if the terminal device can neither receive a signal of the GNSS nor receive a signal of the base station, the terminal device may be used as a synchronization source and send a synchronization signal. The synchronization source is used by a vehicle terminal to obtain timing synchronization. The timing synchronization is implemented between vehicle terminals by configuring a synchronization resource of the LTE-V system to send a synchronization subframe.

In the LTE-V system, the synchronization resource may be sent by the base station, or preconfigured. In the IC scenario, there is usually only one set of synchronization resources. The vehicle terminal may receive a synchronization source signal sent by the base station or the GNSS. The vehicle terminal sends synchronization information to another vehicle terminal device by using the synchronization resource of the LTE-V system. For example, a terminal device V2 in FIG. 1 sends synchronization information to a terminal device V3. In the OOC scenario, there are usually two sets of synchronization resources. When the vehicle terminal device cannot receive the synchronization source signal sent by the GNSS, for example, the terminal device V3 in FIG. 1 may receive, by using one set of synchronization resources, the synchronization information sent by the terminal device V2, and the terminal device V3 may send the synchronization information to a terminal device V4 and/or a terminal device V5 by using the other set of synchronization resources. In each set of synchronization resources, synchronization signals have a fixed period. For example, the synchronization period is 160 ms. If two sets of synchronization resources are configured, the two sets of synchronization resources have different time offsets. Therefore, the two sets of synchronization resources are time-division. An out-of-coverage user receives a synchronization signal on one set of synchronization resources, and sends the synchronization signal on the other set of synchronization resources.

In the LTE-V system, a synchronization subframe is not used for data transmission. Therefore, a subframe that is of a resource pool and that can be used for LTE-V data transmission is a system subframe other than the synchronization subframe, and a configuration of the resource pool is indicated by using a bitmap. A length of the bitmap is 16 bits, 20 bits, or 100 bits. Each bit in the bitmap indicates whether a subframe in the resource pool is available. A period of a system frame number (SFN) or a direct frame number (DFN) includes 10240 subframes. If a quantity of remaining subframes other than the synchronization subframe is not an integral multiple of the bitmap length, a bitmap indication goes beyond an SFN period boundary or a DFN period boundary. Consequently, the indication is blurred. Therefore, in the LTE-V system, a specific quantity of subframes are reserved, and these reserved subframes are not used for LTE-V data transmission. In this way, subframes other than the synchronization subframe and the reserved subframes in the LTE-V resource pool can be represented by using an integral multiple of a bitmap, to avoid a case in which an indication is blurred because the bitmap indication goes beyond the SFN period boundary or the DFN period boundary. As shown in FIG. 2, 201 represents a synchronization subframe in an SFN or a DFN, 202 represents subframes other than the synchronization subframe in the SFN or the DFN and may also be understood as an LTE-V resource pool, and 203 represents indication blurring because a bitmap indication goes beyond an SFN period boundary or a DFN period boundary.

However, currently, how to enable a terminal device to determine a location of a reserved subframe and accurately transmit data by using an LTE-V resource pool based on a bitmap is not correspondingly discussed in the prior art.

SUMMARY

Embodiments of the present invention relate to a resource configuration method, a terminal device, and a base station, to resolve the following prior-art problem: A terminal cannot determine a location of a reserved subframe and cannot accurately transmit data by using an LTE-V resource pool based on a bitmap.

According to a first aspect, an embodiment of the present invention provides a resource configuration method. The method includes: obtaining, by a terminal device, at least one of configuration information of a first resource, configuration information of at least one set of synchronization resources, time domain period information, bitmap information, configuration information of a reserved resource, and configuration information of a time division duplex TDD system, where the first resource is a set of at least one subframe, the synchronization resource includes at least one synchronization subframe, the TDD system includes a downlink subframe and a special subframe, the reserved resource includes at least one reserved subframe, and the synchronization subframe, the reserved subframe, the downlink subframe, and the special subframe are not used for device-to-device D2D data transmission performed by the terminal device; determining, by the terminal device, a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system; determining, by the terminal device, a second resource based on at least one of the configuration information of the first resource, the configuration information of the at least one set of synchronization resources, the configuration information of the TDD system, the quantity information of reserved subframes, and the time domain location information of the reserved subframe in the first resource, where the second resource is a set of candidate subframes for the D2D data transmission performed by the terminal device; and performing, by the terminal device, the D2D data transmission based on the bitmap information and the second resource.

According to the resource configuration method provided in this embodiment of the present invention, the terminal device may determine the quantity of reserved subframes and the time domain location of the reserved subframe based on information sent by a base station or preconfigured information, and further accurately perform the D2D data transmission by using the second resource based on the bitmap.

In an optional embodiment, the configuration information of the at least one set of synchronization resources includes synchronization period information and offset information of a start synchronization subframe in each set of synchronization resources. The configuration information of the first resource is quantity information of subframes included in the first resource. The bitmap information includes bitmap length information. The terminal device determines at least one of a quantity of synchronization subframes included in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes included in the first resource, the configuration information of the TDD system, the synchronization period information, and the offset information of the start synchronization subframe in each set of synchronization resources in the at least one set of synchronization resources.

In an optional embodiment, the terminal device determines the quantity of reserved subframes based on the configuration information of the reserved subframe, or the terminal device determines the quantity of reserved subframes based on at least one of quantity information of synchronization subframes in the first resource, the quantity information of downlink subframes, and the quantity information of special subframes, the quantity information of subframes included in the first resource, and the bitmap length information.

Specifically, the quantity of reserved subframes may be the information sent by the base station or the preconfigured information. The quantity of reserved subframes is subject to a condition that a quantity of candidate subframes in a resource pool can be exactly divided by a bitmap length. A minimum quantity of reserved subframes may be calculated, or more reserved subframes may be configured.

In an optional embodiment, the terminal device determines the time domain location of the reserved subframe in the first resource based on at least one of the quantity information of subframes included in the first resource, the quantity information of synchronization subframes included in each set of synchronization resources in the first resource, the quantity information of reserved subframes, the time domain period information, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

In an optional embodiment, the configuration information of the reserved resource includes offset information of the reserved subframe. When the quantity of synchronization subframes is not zero, and when the quantity of synchronization subframes included in each set of synchronization resources is less than or equal to the quantity of reserved subframes, the terminal device obtains a first divisor $C_1$ and a remainder Y by dividing the quantity of reserved subframes by the quantity of synchronization subframes included in each set of synchronization resources, where $C_1$ is an integer greater than zero, Y is an integer greater than zero, and Y is less than the quantity of synchronization subframes included in each set of synchronization resources; the terminal device determines that each synchronization period includes $C_1$ reserved subframes, where first Y synchronization periods each further include one reserved subframe; and the terminal device determines the time domain location of the reserved subframe in the first resource based on the offset of the reserved subframe, where each synchronization period includes one synchronization subframe of each set of synchronization resources, a time domain location of a reserved subframe does not overlap with a time domain location of a synchronization subframe, and if one synchronization period includes more than one reserved subframe, time domain locations of the more than one reserved subframe do not overlap.

In an optional embodiment, the configuration information of the reserved resource includes offset information of the reserved subframe. When the quantity of synchronization subframes is not zero, and when the quantity of synchronization subframes included in each set of synchronization resources is less than or equal to the quantity of reserved subframes, the terminal device obtains $C_1$ and Y by dividing the quantity of reserved subframes by the quantity of synchronization subframes included in each set of synchronization resources; the terminal device obtains a second divisor $C_2$ by dividing the quantity of synchronization subframes included in each set of synchronization resources by Y, where $C_2$ is an integer greater than zero; the terminal device determines that each synchronization period includes $C_1$ reserved subframes, where every $C_2$ synchronization periods further include one reserved subframe; and the terminal device determines the time domain location of the reserved subframe in the first resource based on the offset information of the reserved subframe, where each synchronization period includes one synchronization subframe of each set of synchronization resources, a time domain location of a reserved subframe does not overlap with a time domain location of a synchronization subframe, and if one synchronization period includes more than one reserved subframe, time domain locations of the more than one reserved subframe do not overlap.

In an optional embodiment, the configuration information of the reserved resource includes offset information of the reserved subframe. When the quantity of synchronization subframes is not zero, and when the quantity of synchronization subframes included in each set of synchronization resources is greater than the quantity of reserved subframes, the terminal device obtains a third divisor $C_3$ by dividing the quantity of synchronization subframes included in each set of synchronization resources by the quantity of reserved subframes, where $C_3$ is an integer greater than zero; the terminal device determines that every $C_3$ synchronization periods include one reserved subframe; and the terminal device determines the time domain location of the reserved subframe in the first resource based on the offset information of the reserved subframe, where each synchronization period includes one synchronization subframe of each set of synchronization resources, and a time domain location of a reserved subframe does not overlap with a time domain location of a synchronization subframe.

In an optional embodiment, the configuration information of the reserved resource includes offset information of the reserved subframe. The terminal device obtains a fourth divisor $C_4$ by dividing the quantity of subframes included in the first resource by the quantity of reserved subframes and then dividing an obtained quotient by the time domain period, where $C_4$ is an integer greater than zero. The terminal device determines a subframe deviation between two adjacent reserved subframes based on $C_4$ and the time domain period. The terminal device determines the time domain location of the reserved subframe in the first resource based on the subframe deviation between the two adjacent reserved subframes, the offset of the reserved subframe, and the quantity of reserved subframes.

In an optional embodiment, the configuration information of the reserved resource includes offset information of the reserved subframe. The terminal device obtains a fifth divisor $C_5$ by dividing the quantity of subframes included in the first resource by the quantity of reserved subframes, where $C_5$ is an integer greater than zero. The terminal device determines a subframe deviation between two adjacent reserved subframes based on $C_5$. The terminal device determines the time domain location of the reserved subframe in the first resource based on the subframe deviation between the two adjacent reserved subframes, the offset of the reserved subframe, and the quantity of reserved subframes.

In an optional embodiment, when the quantity of synchronization subframes is not zero, and when the time domain location of the reserved subframe overlaps with a time domain location of a first synchronization subframe, the terminal device determines a time domain location of the reserved subframe at a distance of N subframes from the first synchronization subframe, where N is an integer greater than or equal to 1.

In an optional embodiment, when the quantity of downlink subframes is not zero, and when the time domain location of the reserved subframe overlaps with a time domain location of a first downlink subframe, the terminal device determines a time domain location of the reserved subframe at a distance of M subframes from the first downlink subframe, where M is an integer greater than or equal to 1.

In an optional embodiment, when the quantity of special subframes is not zero, and when the time domain location of the reserved subframe overlaps with a time domain location of a first special subframe, the terminal device determines a time domain location of the reserved subframe at a distance of S subframes from the first special subframe, where S is an integer greater than or equal to 1.

Specifically, the configuration information of the reserved subframe includes offset information of the reserved subframe in a synchronization period; offset information of the reserved subframe relative to a start subframe of the first resource in a time domain period interval; or offset information of reserved subframes relative to a start subframe of the first resource, where the reserved subframes are uniformly distributed in the first resource. In addition, the offset information of the reserved subframe may further include information such as offset information when the reserved subframe overlaps with the synchronization subframe, and offset information when the reserved subframe overlaps with the downlink subframe or the special subframe.

In an optional embodiment, the terminal device determines the second resource based on at least one of the quantity information of subframes included in the first resource, the quantity information of synchronization subframes included in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

Specifically, when the quantity of synchronization subframes, the quantity of downlink subframes, or the quantity of special subframes is zero, when determining the second resource, the terminal device does not consider time domain location information corresponding to a subframe whose quantity is zero.

In an optional embodiment, the at least one of the configuration information of the first resource, the configuration information of the at least one set of synchronization resources, the time domain period information, the bitmap information, the configuration information of the reserved resource, and the configuration information of the TDD system is information received from a base station or preconfigured information.

According to a second aspect, an embodiment of the present invention provides a resource configuration method. The method includes: sending, by a base station, at least one of configuration information of a first resource, configuration information of at least one set of synchronization resources, time domain period information, bitmap information, configuration information of a reserved resource, and configuration information of a time division duplex TDD system to a terminal device, where the at least one of the configuration information of the first resource, the configuration information of the at least one set of synchronization resources, the time domain period information, the bitmap information, the configuration information of the reserved resource, and the configuration information of the TDD system is used by the terminal device to determine a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system, and at least one of the configuration information of the first resource, the configuration information of the at least one set of synchronization resources, the configuration information of the TDD system, the quantity information of reserved subframes, and the time domain location information of the reserved subframe in the first resource is used by the terminal device to determine a second resource based on the at least one of the configuration information of the first resource, the configuration information of the at least one set of synchronization resources, the configuration information of the TDD system, the quantity information of reserved subframes, and the time domain location information of the reserved subframe in the first resource.

The first resource is a set of at least one subframe, the synchronization resource includes at least one synchronization subframe, the TDD system includes a downlink subframe and a special subframe, the reserved resource includes at least one reserved subframe, the synchronization subframe, the reserved subframe, the downlink subframe, and the special subframe are not used for device-to-device D2D data transmission performed by the terminal device, and the second resource is a set of candidate subframes for the D2D data transmission performed by the terminal device.

In an optional embodiment, the bitmap information includes bitmap length information. If the base station sends the configuration information of the reserved resource to the terminal device, and the configuration information of the reserved resource includes the quantity information of reserved subframes, the quantity of reserved subframes enables exact division of the quantity of candidate subframes by the bitmap length.

According to a third aspect, an embodiment of the present invention provides a terminal device. The terminal device includes: an obtaining unit, configured to obtain at least one of configuration information of a first resource, configuration information of at least one set of synchronization resources, time domain period information, bitmap information, configuration information of a reserved resource, and configuration information of a time division duplex TDD system, where the first resource is a set of at least one subframe, the synchronization resource includes at least one synchronization subframe, the TDD system includes a downlink subframe and a special subframe, the reserved resource includes at least one reserved subframe, and the synchronization subframe, the reserved subframe, the downlink subframe, and the special subframe are not used for device-to-device D2D data transmission performed by the terminal device; a determining unit, configured to determine a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system, where the determining unit is further configured to determine a second resource based on at least one of the configuration information of the first resource, the configuration information of the at least one set of synchronization resources, the configuration information of the TDD system, the quantity information of reserved subframes, and the time domain location information of the reserved subframe in the first resource, where the second resource is a set of candidate subframes for the D2D data transmission performed by the terminal device; and a data transmission unit, configured to perform the D2D data transmission based on the bitmap information and the second resource.

In an optional embodiment, the configuration information of the at least one set of synchronization resources includes synchronization period information and offset information of a start synchronization subframe in each set of synchronization resources. The configuration information of the first resource is quantity information of subframes included in the first resource. The bitmap information includes bitmap length information. The determining unit is specifically configured to determine at least one of a quantity of synchronization subframes included in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes included in the first resource, the configuration information of the TDD system, the synchronization period information, and the offset information of the start synchronization subframe in each set of synchronization resources in the at least one set of synchronization resources.

In an optional embodiment, the determining unit is specifically configured to determine the quantity of reserved subframes based on the configuration information of the reserved subframe, or the determining unit is specifically configured to determine the quantity of reserved subframes based on at least one of quantity information of synchronization subframes in the first resource, the quantity information of downlink subframes, and the quantity information of special subframes, the quantity information of subframes included in the first resource, and the bitmap length information.

In an optional embodiment, the determining unit is specifically configured to determine the time domain location of the reserved subframe in the first resource based on at least one of the quantity information of subframes included in the first resource, the quantity information of synchronization subframes included in each set of synchronization resources in the first resource, the quantity information of reserved subframes, the time domain period information, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

In an optional embodiment, the configuration information of the reserved resource includes offset information of the reserved subframe. The determining unit is specifically configured to: when the quantity of synchronization subframes is not zero, and when the quantity of synchronization subframes included in each set of synchronization resources is less than or equal to the quantity of reserved subframes, obtain a first divisor $C_1$ and a remainder Y by dividing the quantity of reserved subframes by the quantity of synchronization subframes included in each set of synchronization resources, where $C_1$ is an integer greater than zero, Y is an integer greater than zero, and Y is less than the quantity of synchronization subframes included in each set of synchronization resources; determine that each synchronization period includes $C_1$ reserved subframes, where first Y synchronization periods each further include one reserved subframe; and determine the time domain location of the reserved subframe in the first resource based on the offset of the reserved subframe, where each synchronization period includes one synchronization subframe of each set of synchronization resources, a time domain location of a reserved subframe does not overlap with a time domain location of a synchronization subframe, and if one synchronization period includes more than one reserved subframe, time domain locations of the more than one reserved subframe do not overlap.

In an optional embodiment, the configuration information of the reserved resource includes offset information of the reserved subframe. The determining unit is specifically configured to: when the quantity of synchronization subframes is not zero, and when the quantity of synchronization subframes included in each set of synchronization resources is less than or equal to the quantity of reserved subframes, obtain $C_1$ and Y by dividing the quantity of reserved subframes by the quantity of synchronization subframes included in each set of synchronization resources; obtain a second divisor $C_2$ by dividing the quantity of synchronization subframes included in each set of synchronization resources by Y, where $C_2$ is an integer greater than zero; determine that each synchronization period includes $C_1$ reserved subframes, where every $C_2$ synchronization periods further include one reserved subframe; and determine the time domain location of the reserved subframe in the first resource based on the offset information of the reserved subframe, where each synchronization period includes one synchronization subframe of each set of synchronization resources, a time domain location of a reserved subframe does not overlap with a time domain location of a synchronization subframe, and if one synchronization period includes more than one reserved subframe, time domain locations of the more than one reserved subframe do not overlap.

In an optional embodiment, the configuration information of the reserved resource includes offset information of the reserved subframe. The determining unit is specifically configured to: when the quantity of synchronization subframes is not zero, and when the quantity of synchronization subframes included in each set of synchronization resources is greater than the quantity of reserved subframes, obtain a third divisor $C_3$ by dividing the quantity of synchronization subframes included in each set of synchronization resources by the quantity of reserved subframes, where $C_3$ is an integer greater than zero; determine that every $C_3$ synchronization periods include one reserved subframe; and determine the time domain location of the reserved subframe in the first resource based on the offset information of the reserved subframe, where each synchronization period includes one synchronization subframe of each set of synchronization resources, and a time domain location of a reserved subframe does not overlap with a time domain location of a synchronization subframe.

In an optional embodiment, the configuration information of the reserved resource includes offset information of the reserved subframe. The determining unit is specifically configured to: obtain a fourth divisor $C_4$ by dividing the quantity of subframes included in the first resource by the quantity of reserved subframes and then dividing an obtained quotient by the time domain period, where $C_4$ is an integer greater than zero; determine a subframe deviation between two adjacent reserved subframes based on $C_4$ and the time domain period; and determine the time domain location of the reserved subframe in the first resource based on the subframe deviation between the two adjacent reserved subframes, the offset of the reserved subframe, and the quantity of reserved subframes.

In an optional embodiment, the configuration information of the reserved resource includes offset information of the reserved subframe. The determining unit is specifically configured to: obtain a fifth divisor $C_5$ by dividing the quantity of subframes included in the first resource by the quantity of reserved subframes, where $C_5$ is an integer greater than zero; determine a subframe deviation between two adjacent reserved subframes based on $C_5$; and determine the time domain location of the reserved subframe in the first resource based on the subframe deviation between the two adjacent reserved subframes, the offset of the reserved subframe, and the quantity of reserved subframes.

In an optional embodiment, the determining unit is specifically configured to: when the quantity of synchronization subframes is not zero, and when the time domain location of the reserved subframe overlaps with a time domain location of a first synchronization subframe, determine a time domain location of the reserved subframe at a distance of N subframes from the first synchronization subframe, where N is an integer greater than or equal to 1.

In an optional embodiment, the determining unit is specifically configured to: when the quantity of downlink subframes is not zero, and when the time domain location of the reserved subframe overlaps with a time domain location of a first downlink subframe, determine, by the terminal device, a time domain location of the reserved subframe at a distance of M subframes from the first downlink subframe, where M is an integer greater than or equal to 1.

In an optional embodiment, the determining unit is specifically configured to: when the quantity of special subframes is not zero, and when the time domain location of the reserved subframe overlaps with a time domain location of a first special subframe, determine a time domain location of the reserved subframe at a distance of S subframes from the first special subframe, where S is an integer greater than or equal to 1.

In an optional embodiment, the terminal device is further specifically configured to determine the second resource based on at least one of the quantity information of subframes included in the first resource, the quantity information of synchronization subframes included in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

In an optional embodiment, the at least one of the configuration information of the first resource, the configuration information of the at least one set of synchronization resources, the time domain period information, the bitmap information, the configuration information of the reserved resource, and the configuration information of the TDD system is information received from a base station or preconfigured information.

According to a fourth aspect, an embodiment of the present invention provides a base station. The base station includes: a sending unit, configured to send at least one of configuration information of a first resource, configuration information of at least one set of synchronization resources, time domain period information, bitmap information, configuration information of a reserved resource, and configuration information of a time division duplex TDD system to a terminal device, where the at least one of the configuration information of the first resource, the configuration information of the at least one set of synchronization resources, the time domain period information, the bitmap information, the configuration information of the reserved resource, and the configuration information of the TDD system is used by the terminal device to determine a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system, and at least one of the configuration information of the first resource, the configuration information of the at least one set of synchronization resources, the configuration information of the TDD system, the quantity information of reserved subframes, and the time domain location information of the reserved subframe in the first resource is used by the terminal device to determine a second resource based on the at least one of the configuration information of the first resource, the configuration information of the at least one set of synchronization resources, the configuration information of the TDD system, the quantity information of reserved subframes, and the time domain location information of the reserved subframe in the first resource.

The first resource is a set of at least one subframe, the synchronization resource includes at least one synchronization subframe, the TDD system includes a downlink subframe and a special subframe, the reserved resource includes at least one reserved subframe, the synchronization subframe, the reserved subframe, the downlink subframe, and the special subframe are not used for device-to-device D2D data transmission performed by the terminal device, and the second resource is a set of candidate subframes for the D2D data transmission performed by the terminal device.

In an optional embodiment, the bitmap information includes bitmap length information. If the base station sends the configuration information of the reserved resource to the terminal device, and the configuration information of the reserved resource includes the quantity information of reserved subframes, the base station further includes: a determining unit, configured to determine the quantity of reserved subframes, so that the quantity of candidate subframes is exactly divided by a length of the bitmap length.

Based on the foregoing technical solutions, the embodiments of the present invention provide the resource configuration method, the terminal device, and the base station. The terminal device may determine the quantity of reserved subframes and the time domain location of the reserved subframe based on the information sent by the base station or the preconfigured information, and further accurately perform the D2D data transmission by using the second resource based on the bitmap.

BRIEF DESCRIPTION OF DRAWINGS

FIG. 3 is a schematic architectural diagram of a communications system according to an embodiment of the present invention;

FIG. 4 is a flowchart of a resource configuration method according to an embodiment of the present invention;

FIG. 6 is a schematic diagram of another resource configuration according to an embodiment of the present invention;

DESCRIPTION OF EMBODIMENTS

Figure 1:
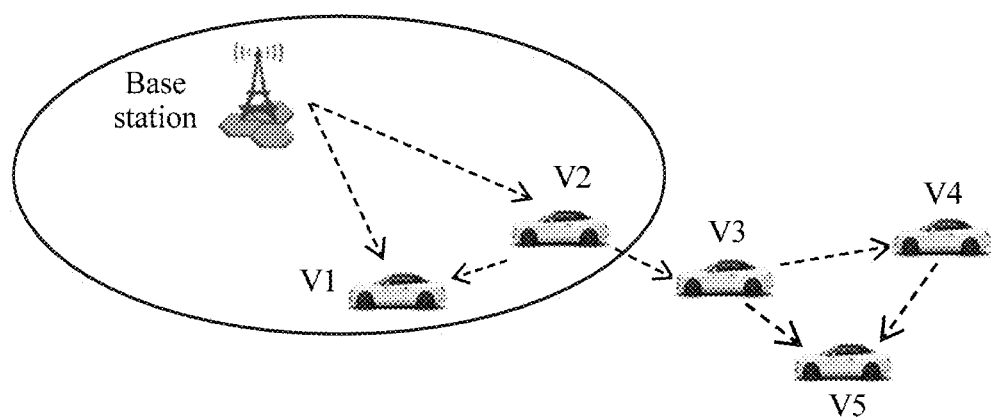
FIG. 1 is a schematic diagram of an application scenario of the LTE-V Internet of Vehicles.
Figure 2:
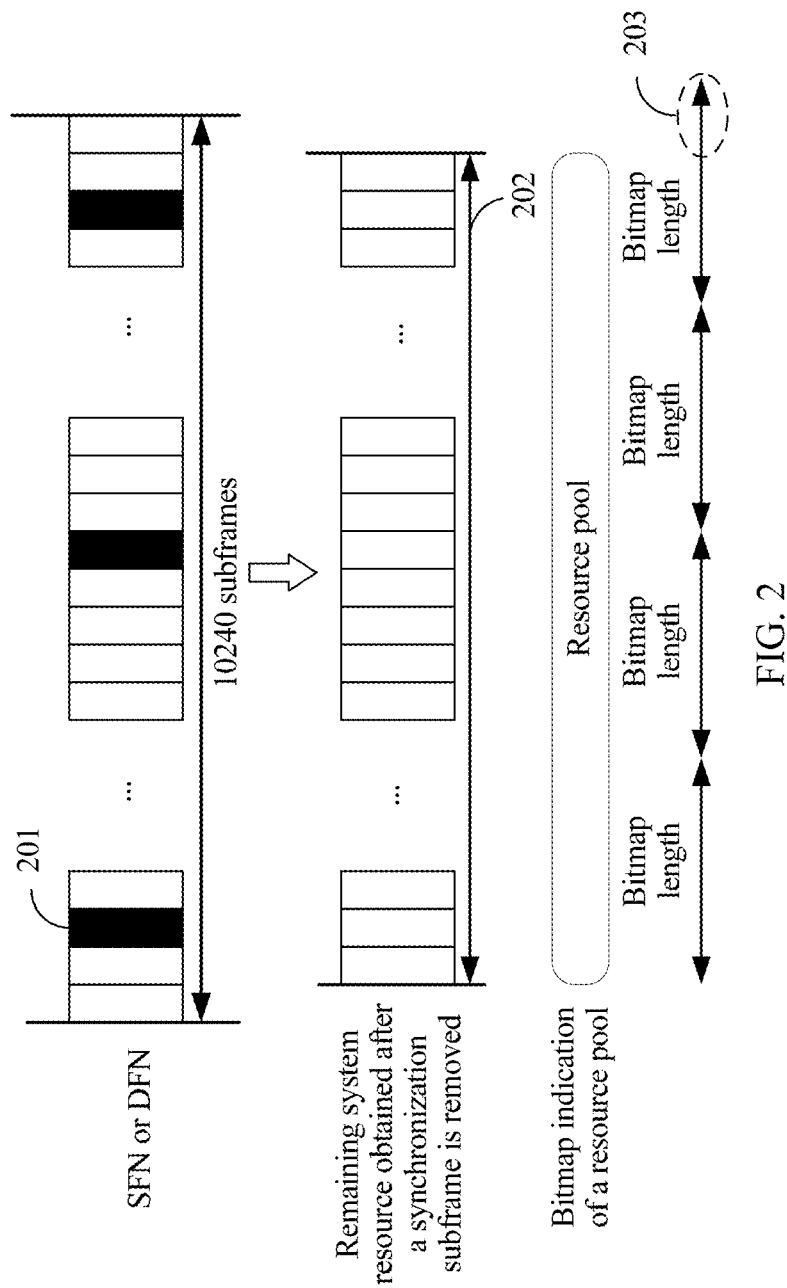
FIG. 2 is a schematic diagram of a bitmap indication of an LTE-V resource pool.

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Network architectures and service scenarios described in the embodiments of the present invention are intended to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are further applicable to a similar technical problem.

In the embodiments of the present invention, nouns "network" and "system" are usually interchangeably used, but meanings of the nouns can be understood by a person skilled in the art. In the embodiments of the present invention, a base station is an apparatus that is deployed in a radio access network and that is configured to provide a wireless communication function for a terminal device. The base station has a radio resource management function and communicates with a terminal device, or is used as a central controller to assist in direct communication between terminal devices.

FIG. 3 is a schematic architectural diagram of a communications system according to an embodiment of the present invention. A technology described in the embodiments of the present invention may be applied to a Long Term Evolution (LTE) system or other wireless communications systems in which various radio access technologies are used, for example, systems in which access technologies such as Code Division Multiple Access, Frequency Division Multiple Access, Time Division Multiple Access, orthogonal frequency division multiple access, and single-carrier frequency division multiple access are used. In addition, the technology may also be applied to a subsequent evolved system of the LTE system, for example, a 5th generation system. For clarity, the LTE system is merely used as an example herein for description. More specifically, a communication method provided in the embodiments of the present invention is applicable to an Internet of Vehicles system, or a D2D system. Participation of the base station is not considered.

In the embodiments of the present invention, the terminal device may include various in-vehicle devices that have a wireless communication function, or other processing devices connected to a wireless modem. The terminal device includes but is not limited to a vehicle, a handheld device, a device that can communicate with a base station device, or a device that can directly communicate with another terminal device. For ease of description, the devices mentioned above are collectively referred to as a terminal device in the embodiments of the present invention.

As shown in FIG. 3, the terminal device determines at least one of a quantity of synchronization subframes, a time domain location of a synchronization subframe, a quantity of downlink subframes in a time division duplex (TDD) system, a quantity of special subframes in the TDD system, a time domain location of a downlink subframe in the TDD system, and a time domain location of a special subframe in the TDD system based on at least one of configuration information of a first resource, bitmap information, configuration information of a reserved subframe, configuration information of at least one set of synchronization resources, time domain period information, and configuration information of the TDD system that are sent by a base station or preconfigured. Further, the terminal device determines a quantity of reserved subframes based on at least one of a quantity of subframes included in the first resource, the bitmap information, the quantity of synchronization subframes, the quantity of downlink subframes in the TDD system, and the quantity of special subframes in the TDD system; or the terminal device determines a quantity of reserved subframes based on the configuration information of the reserved subframe. The terminal device determines a time domain location of the reserved subframe based on at least one of the configuration information of the first resource, the bitmap information, the time domain period information, the quantity of synchronization subframes, the time domain location of the synchronization subframe, the quantity of downlink subframes in the TDD system, the quantity of special subframes in the TDD system, the time domain location of the downlink subframe in the TDD system, the time domain location of the special subframe in the TDD system, and the quantity of reserved subframes in the first resource. Further, the terminal device determines a second resource based on at least one of the configuration information of the first resource, the quantity of synchronization subframes, the time domain location of the synchronization subframe, the quantity of reserved subframes in the first resource, the time domain location of the reserved subframe, the quantity of downlink subframes in the TDD system, the quantity of special subframes in the TDD system, the time domain location of the downlink subframe in the TDD system, and the time domain location of the special subframe in the TDD system. The first resource is a set of at least one subframe. The synchronization resource includes at least one synchronization subframe. The TDD system includes a downlink subframe and a special subframe. The reserved resource includes at least one reserved subframe. The synchronization subframe, the reserved subframe, the downlink subframe, and the special subframe are not used for device-to-device D2D data transmission performed by the terminal device. The second resource is a set of candidate subframes for the D2D data transmission performed by the terminal device. The terminal device performs the D2D data transmission based on the bitmap information and the second resource.

In the communications system provided in this embodiment of the present invention, the terminal device may determine the quantity of reserved subframes and the time domain location of the reserved subframe based on the information sent by the base station or the preconfigured information, and further accurately perform the D2D data transmission by using the second resource based on the bitmap.

The solutions provided in the embodiments of the present invention are described in detail below with reference to FIG. 4. FIG. 4 is a flowchart of a resource configuration method according to an embodiment of the present invention. In this embodiment of the present invention, the method is performed by a terminal device. As shown in FIG. 4, this embodiment specifically includes the following steps.

Step S101: The terminal device obtains at least one of configuration information of a first resource, configuration information of at least one set of synchronization resources, time domain period information, bitmap information, configuration information of a reserved resource, and configuration information of a TDD system.

The first resource is a set of at least one subframe. For example, the first resource includes 10240 subframes or another quantity of subframes. The synchronization resource includes at least one synchronization subframe. The TDD system includes a downlink subframe and a special subframe, in other words, subframes included in the TDD system include a downlink subframe and a special subframe. The reserved resource includes at least one reserved subframe. The synchronization subframe, the reserved subframe, the downlink subframe, and the special subframe are not used for device-to-device D2D data transmission performed by the terminal device.

In an optional embodiment, the first resource may be an SFN or a DFN. A plurality of subframes included in the SFN are time-division, and a plurality of subframes included in the DFN are also time-division. It should be understood that the synchronization period mentioned below may be in a unit of a subframe, and a quantity of subframes reflects a size of a period. For example, a synchronization period includes T subframes, and T is a natural number.

Optionally, the at least one of the configuration information of the first resource, the configuration information of the at least one set of synchronization resources, the time domain period information, the bitmap information, the configuration information of the reserved resource, and the configuration information of the TDD system is information received from a base station or preconfigured information.

In an optional embodiment, the terminal device may prestore the at least one of the configuration information of the first resource, the configuration information of the at least one set of synchronization resources, the time domain period information, the bitmap information, the configuration information of the reserved resource, and the configuration information of the TDD system; or the terminal device may receive, from the base station, the at least one of the configuration information of the first resource, the configuration information of the at least one set of synchronization resources, the time domain period information, the bitmap information, the configuration information of the reserved resource, and the configuration information of the TDD system.

In an optional embodiment, that the terminal device prestores the foregoing related configuration information means that the terminal device prestores one or more types of the foregoing configuration information according to a protocol of the terminal device.

Step S102: The terminal device determines a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system.

Optionally, the configuration information of the at least one set of synchronization resources includes synchronization period information and offset information of a start synchronization subframe in each set of synchronization resources. The configuration information of the first resource is quantity information of subframes included in the first resource. The bitmap information includes bitmap length information.

In an optional embodiment, the synchronization period is a period of a synchronization signal. The synchronization signal herein may be a synchronization subframe. In another embodiment of the present invention, the synchronization signal may alternatively be in another form, to achieve a timing synchronization effect between terminal devices through synchronization signal sending or receiving. In this embodiment of the present invention, only the synchronization subframe is used as an example for description, and each synchronization period includes one synchronization subframe in each set of synchronization resources. To be specific, when two sets of synchronization resources are configured in the first resource, and the two sets of synchronization resources have a same synchronization period but different offsets of start synchronization subframes, each synchronization period includes two synchronization subframes. The synchronization period may be changed according to a protocol of the terminal device or through controlling by the base station, to be adjusted based on an actual requirement. In this embodiment of the present invention, an example in which the synchronization period is 160 ms is used for description.

Further, the terminal device determines at least one of a quantity of synchronization subframes included in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes included in the first resource, the configuration information of the TDD system, the synchronization period information, and the offset information of the start synchronization subframe in each set of synchronization resources in the at least one set of synchronization resources.

In an optional embodiment, when the terminal device receives the configuration information of the at least one set of synchronization resources, the terminal device determines the quantity of synchronization subframes included in each set of synchronization resources in the first resource and the time domain location of the synchronization subframe in the first resource based on the synchronization period information in the configuration information of the at least one set of synchronization resources. In an optional embodiment, synchronization subframes are usually uniformly distributed in the first resource based on the synchronization period. When the first resource is an SFN or a DFN, one SFN period or DFN period usually includes 10240 subframes. One subframe corresponds to a time of 1 ms. If a synchronization period is 160 ms, the synchronization period includes 160 subframes, where the 160 subframes include one synchronization subframe of each set of synchronization resources. Further, the quantity of synchronization subframes included in each set of synchronization resources is 10240/160=64. The synchronization subframes in each set of synchronization resources are uniformly distributed at time domain locations corresponding to the first resource, based on the offset information of the start synchronization subframe in each set of synchronization resources and the synchronization period.

In an optional embodiment, when the terminal device receives the configuration information of the TDD system, the terminal device determines the quantity of downlink subframes in the first resource, the quantity of special subframes, the time domain location of the downlink subframe in the first resource, and the time domain location of the special subframe in the first resource based on the configuration information of the TDD system. The special subframe included in the TDD system is a subframe that includes a downlink pilot time slot (DwPTS), a guard period (GP), and an uplink pilot time slot (UpPTS).

Optionally, the terminal device determines the quantity of reserved subframes based on the configuration information of the reserved subframe, or the terminal device determines the quantity of reserved subframes based on at least one of the quantity information of synchronization subframes in the first resource, the quantity information of downlink subframes, and the quantity information of special subframes, the quantity information of subframes included in the first resource, and the bitmap length information.

In an optional embodiment, the quantity of reserved subframes may be sent by the base station or preconfigured. The base station needs to send the configuration information of the reserved resource to the terminal device to send the quantity of reserved subframes. The quantity of reserved subframes is subject to a condition that a quantity of candidate subframes in a resource pool can be exactly divided by the bitmap length. For example, if a bitmap is a 16-bit character, a quantity of bits in the bitmap is 16, and a bitmap length is 16. When information obtained by the terminal includes the configuration information of the synchronization resource and the configuration information of the TDD system, the synchronization subframe, the downlink subframe, and the special subframe need to be excluded from the first resource, and the configured quantity of reserved subframes is excluded, so that a quantity of remaining subframes in the first resource can be exactly divided by the bitmap length.

In an optional embodiment, that the quantity of reserved subframes is subject to a condition that a quantity of candidate subframes in a resource pool can be exactly divided by the bitmap length indicates that the quantity of reserved subframes is a remainder obtained after the quantity of synchronization subframes, the quantity of downlink subframes, and the quantity of special subframes are subtracted from the quantity of subframes included in the first resource and an obtained difference is divided by the bitmap length. The quantity of reserved subframes that is calculated in this way is a minimum quantity of reserved subframes. In addition, in some cases, for example, a quantity proportion of reserved subframes may be controlled to control a proportion of candidate subframes in the first resource that are used for an LTE-V resource pool. Alternatively, in some cases, more resources need to be reserved. In this case, the quantity information of reserved subframes may alternatively be directly configured in the configuration information of the reserved resource. In this case, the quantity information of reserved subframes may be the foregoing calculated minimum quantity of reserved subframes plus an integral multiple of the bitmap length.

In conclusion, it should be understood that the quantity of reserved subframes is used to regulate the quantity of candidate subframes of the LTE-V resource pool, so that the quantity of candidate subframes can be exactly divided by the bitmap length. A person skilled in the art should understand that the method for determining a time domain location of a reserved subframe provided in step S102 in this embodiment of the present invention, the following Embodiment 1, Embodiment 2, and Embodiment 3 is also applicable when the quantity of reserved subframes meets the foregoing condition.

As described above, when the synchronization resource is configured, the synchronization period is X ms (X=160 in an LTE-V system). Therefore, the quantity Q of reserved subframes can be determined based on the quantity K (for example, K=1, 2) of synchronization resources and the period X ms of a synchronization subframe in each synchronization resource. It is assumed that the bitmap length is G, and the quantity of subframes included in the first resource is R. First, the quantity of synchronization subframes is determined as D=K*R/X based on the synchronization period X and the quantity K of synchronization resources. Then, the minimum quantity of reserved subframes is determined based on the quantity R of subframes included in the first resource, the quantity D of synchronization subframes, and the bitmap length G Specific calculation is shown in formula (1):

$$Q=\text{mod}(R-D,G) \quad (1)$$

Herein, mod( ) represents a modulo operation. In different examples, the quantity of reserved subframes is calculated based on the bitmap length, the quantity of synchronization subframes, and the quantity of subframes included in the first resource. For details, refer to Table 1.

In addition, in a case shown in Table 1, the configuration information of the TDD system is not configured. In other words, the first resource does not include the downlink subframe and the special subframe that correspond to the TDD system. If the first resource includes the downlink subframe and the special subframe that correspond to the TDD system, when the quantity of reserved subframes is calculated, the quantity of downlink subframes and the quantity of special subframes need to be subtracted from the quantity of subframes included in the first resource, and then an obtained difference is divided by the bitmap length. For a specific calculation method, refer to formula (1).

For ease of understanding of the present invention, Table 1 shows a case in which the quantity of reserved subframes is calculated based on the quantity of synchronization subframes, the bitmap length, and the quantity of subframes included in the first resource. It may be understood that Table 1 shows a case of the minimum quantity of received subframes. In this embodiment of the present invention, a greater quantity of reserved subframes may be further included. Only the minimum quantity of reserved subframes is used as an example herein for description. In Table 1, the first resource is an SFN and includes 10240 subframes, and the synchronization period is 160 ms. In an optional embodiment, when two sets of synchronization resources are configured, the quantity of synchronization subframes is 128.

TABLE 1

| Example | Bitmap length | Quantity of synchronization subframes | Quantity of reserved subframes | Quantity of candidate subframes of an LTE-V resource pool |
| --- | --- | --- | --- | --- |
| 1 | 100 | 0 | 40 | 10200 |
| 2 | 100 | 64 | 76 | 10100 |
| 3 | 100 | 128 | 12 | 10100 |
| 4 | 20 | 0 | 0 | 10240 |
| 5 | 20 | 64 | 16 | 10160 |
| 6 | 20 | 128 | 12 | 10100 |
| 7 | 16 | 0 | 0 | 10240 |
| 8 | 16 | 64 | 0 | 10176 |
| 9 | 16 | 128 | 0 | 10112 |

Specifically, in Example 5 in Table 1, a set of synchronization resources is configured in the first resource SFN. Therefore, 64 synchronization subframes are included in one SFN (including 10240 subframes) period. In this case, the bitmap length is 20. Therefore, it may be determined that the quantity of reserved subframes is Q=mod(10240−64.20)=16.

Optionally, the terminal device determines the time domain location of the reserved subframe in the first resource based on at least one of the quantity information of subframes included in the first resource, the quantity information of synchronization subframes included in each set of synchronization resources in the first resource, the quantity information of reserved subframes, the time domain period information, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

In an optional embodiment, to satisfy a delay requirement of an LTE-V service, the reserved subframes need to be uniformly distributed as much as possible in the subframes included in the entire first resource.

In an optional embodiment, according to the resource configuration method provided in this embodiment of the present invention, the following may be configured: The time domain location of the reserved subframe is related to the time domain location of the synchronization subframe, a subframe deviation between reserved subframes is a fixed time domain period, or the reserved subframes are uniformly distributed in the subframes included in the first resource. In this way, the terminal device can determine the time domain location of the reserved subframe based on related location information of the reserved subframe. For details, refer to detailed descriptions in the following Embodiment 1, Embodiment 2, and Embodiment 3. Details are not described herein.

Step S103: The terminal device determines a second resource based on at least one of the configuration information of the first resource, the configuration information of the at least one set of synchronization resources, the configuration information of the TDD system, the quantity information of reserved subframes, and the time domain location information of the reserved subframe in the first resource, where the second resource is a set of candidate subframes for D2D data transmission performed by the terminal device.

Optionally, the second resource is an LTE-V resource pool.

In an optional embodiment, after receiving the bitmap information, the terminal device determines, based on at least one of the quantity information of subframes included in the first resource, the quantity information of synchronization subframes included in each set of synchronization resources in the first resource, the time domain location of the synchronization subframe in the first resource, the quantity of reserved subframes, the time domain location of the reserved subframe in the first resource, the quantity of downlink subframes, the time domain location of the downlink subframe in the first resource, the quantity of special subframes, and the time domain location of the special subframe in the first resource, a time domain location of a candidate subframe other than the synchronization subframe, the reserved subframe, the downlink subframe, and the special subframe in the subframes included in the first resource. Further, the terminal device may make a location of a candidate subframe correspond to a bitmap, and transmit data by using the candidate subframe based on a bitmap indication.

When the quantity of synchronization subframes, the quantity of downlink subframes, or the quantity of special subframes is zero, when determining the second resource, the terminal device does not consider time domain location information corresponding to a subframe whose quantity is zero.

In an optional embodiment, when the quantity of synchronization subframes is not zero, and the quantity of downlink subframes and the quantity of special subframes are zero, the terminal device determines the second resource based on the quantity information of subframes included in the first resource, the quantity information of synchronization subframes included in each set of synchronization resources in the first resource, the time domain location information of the synchronization subframe in the first resource, the quantity information of reserved subframes, and the time domain location information of the reserved subframe in the first resource.

When the quantity of synchronization subframes, the quantity of downlink subframes, and the quantity of special subframes are not zero, the terminal device determines the second resource based on the quantity information of subframes included in the first resource, the quantity information of synchronization subframes included in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

When the quantity of synchronization subframes, the quantity of downlink subframes, and the quantity of special subframes are zero, the terminal device determines the second resource based on the quantity information of subframes included in the first resource, the quantity information of reserved subframes, and the time domain location information of the reserved subframe in the first resource.

When the quantity of synchronization subframes is zero, and the quantity of downlink subframes and the quantity of special subframes are not zero, the terminal device determines the second resource based on the quantity information of subframes included in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

S104. The terminal device performs the D2D data transmission based on the bitmap information and the second resource.

Specifically, that the terminal device may make a location of a candidate subframe correspond to a bitmap, and transmit data by using the candidate subframe based on a bitmap indication includes: repeating the bitmap in a subframe range of the second resource, so that all subframes in the second resource are indicated by using bits in the bitmap, where a value of a bit corresponding to the bitmap indicates whether a corresponding subframe in the candidate subframe can be used for the D2D data transmission performed by the terminal device.

For a specific resource configuration method shown in FIG. 4, refer to the following three specific embodiments provided in Embodiment 1, Embodiment 2, and Embodiment 3.

Embodiment 1

Specifically, a synchronization resource in an LTE-V system is used for synchronization between terminal devices, and a location of a synchronization subframe is sent by a base station or preconfigured. Therefore, a location of a reserved subframe can be determined based on the location of the synchronization subframe.

In a specific embodiment, the terminal device obtains configuration information of the synchronization resource. The terminal device determines a quantity of synchronization subframes and a time domain location based on the configuration information of the synchronization resource. The terminal device obtains a quantity of reserved subframes. The quantity of reserved subframes may be sent by the base station, preconfigured, or obtained through calculation based on the quantity of synchronization subframes, a quantity of subframes included in a first resource, and a resource pool bitmap length. That the terminal device determines the location of the reserved subframe based on the location of the synchronization subframe is specifically as follows:

In an example, when the quantity of synchronization subframes is not zero, and when the quantity of synchronization subframes included in each set of synchronization resources is less than or equal to the quantity of reserved subframes, the terminal device obtains a first divisor $C_1$ and a remainder Y by dividing the quantity of reserved subframes by the quantity of synchronization subframes included in each set of synchronization resources. The terminal device obtains a second divisor $C_2$ by dividing the quantity of synchronization subframes included in each set of synchronization resources by Y. Herein, $C_1$ is an integer greater than zero, Y is an integer greater than zero, and $C_2$ is an integer greater than zero. The terminal device determines that each synchronization period includes $C_1$ reserved subframes, and every $C_2$ synchronization periods from a first synchronization period within a first resource range further include one reserved subframe. The terminal device determines the time domain location of the reserved subframe in the first resource based on the offset information of the reserved subframe.

A time domain location of the reserved subframe does not overlap with a time domain location of the synchronization subframe. If one synchronization period includes more than one reserved subframe, time domain locations of the more than one reserved subframe do not overlap.

Specifically, one SFN may be set to include P synchronization periods and Q reserved subframes. When $Q \geq P$, $C_1 = \lfloor Q/P \rfloor$, $Y = Q - C_1 * P$, and $C_2 = \lfloor P/Y \rfloor$, where $\lfloor \, \rfloor$ represents rounding down. To be specific, each synchronization period includes $C_1$ reserved subframes, and every $C_2$ synchronization periods from the first synchronization period in an SFN period further include one reserved subframe. Remaining Y reserved subframes are uniformly distributed in the P synchronization periods.

Specifically, in Example 2 in Table 1, a set of synchronization resources is configured, where 64 synchronization periods are included and there are 76 reserved subframes. In this case, $C_1 = 1$, $Y = 12$, and $C_2 = 5$. To be specific, one reserved subframe is first included in each synchronization period, and remaining 12 reserved subframes are uniformly distributed in the 64 synchronization periods, to be specific, every five synchronization periods from the first synchronization period include remaining reserved subframes.

Further, the configuration information of the reserved subframe includes offset information of the reserved subframe. After determining, based on the quantity of reserved subframes and the quantity of synchronization subframes included in each set of synchronization resources, the quantity of reserved subframes included in each synchronization period, the terminal device further determines the time domain location of the reserved subframe in each synchronization period based on the offset information of the reserved subframe. For example, the offset information of the reserved subframe indicates that a subframe deviation of a first reserved subframe in a synchronization period relative to a start subframe in the synchronization period or the first synchronization subframe in the synchronization period is X subframes, where X is an integer greater than or equal to zero, and X is less than the synchronization period. In addition, the synchronization period may further include more than one reserved subframe. The offset information of the reserved subframe indicates that a subframe deviation of a second reserved subframe in a corresponding synchronization period relative to a start subframe of the synchronization period or a first synchronization subframe in the synchronization period is Y subframes, where Y is an integer greater than or equal to zero, and Y is less than the synchronization period. The rest may be deduced by analogy, and exhaustive descriptions are not provided herein. In addition, if a plurality of reserved subframes are included in the synchronization period, time domain locations of the plurality of reserved subframes do not overlap. When the time domain location that is of the reserved subframe and that is obtained based on the offset of the reserved subframe overlaps with the time domain location of the synchronization subframe, the reserved subframe may be moved forward or backward one subframe, or may be moved another fixed length of subframes.

In another example, when the quantity of synchronization subframes is not zero, and when the quantity of synchronization subframes included in each set of synchronization resources is less than or equal to the quantity of reserved subframes, the terminal device obtains a first divisor $C_1$ and a remainder Y by dividing the quantity of reserved subframes by the quantity of synchronization subframes included in each set of synchronization resources, where $C_1$ is an integer greater than zero, Y is an integer greater than zero, and Y is less than the quantity of synchronization subframes included in each set of synchronization resources. The terminal device determines that each synchronization period includes $C_1$ reserved subframes, where first Y synchronization periods each further include one reserved subframe. The terminal device determines the time domain location of the reserved subframe in the first resource based on the offset of the reserved subframe.

Each synchronization period includes one synchronization subframe of each set of synchronization resources. A time domain location of the reserved subframe does not overlap with a time domain location of the synchronization subframe. If one synchronization period includes more than one reserved subframe, time domain locations of the more than one reserved subframe do not overlap.

Similarly, one SFN may be set to include P synchronization periods and Q reserved subframes. When $Q \geq P$, $C_1 = \lfloor Q/P \rfloor$, and $Y = Q - C_1 * P$, where remaining Y reserved subframes are located in the first Y synchronization periods.

Further, for determining the specific time domain location of the reserved subframe based on the offset of the reserved subframe, refer to the foregoing detailed descriptions. Details are not described herein again.

In another example, when the quantity of synchronization subframes is not zero, and when the quantity of synchronization subframes included in each set of synchronization resources is greater than the quantity of reserved subframes, the terminal device obtains a third divisor $C_3$ by dividing the quantity of synchronization subframes included in each set of synchronization resources by the quantity of reserved subframes, where $C_3$ is an integer greater than zero. The terminal device determines that every $C_3$ synchronization periods from the first synchronization period within the first resource range include one reserved subframe. The terminal device determines the time domain location of the reserved subframe in the first resource based on the offset information of the reserved subframe. Each synchronization period includes one synchronization subframe of each set of synchronization resources. A time domain location of a reserved subframe does not overlap with a time domain location of a synchronization subframe.

Similarly, one SFN may be set to include P synchronization periods and Q reserved subframes. When $Q < P$, $C_3 = \lfloor P/Q \rfloor$. To be specific, every $C_3$ synchronization periods from the first synchronization period include one reserved subframe.

Specifically, in Example 5 in Table 1, a set of synchronization resources is configured, where 64 synchronization periods are included and there are 16 reserved subframes. In this case, $C_3 = 4$. To be specific, every four synchronization periods include one reserved subframe. For details, refer to FIG. 5.

Figure 5:
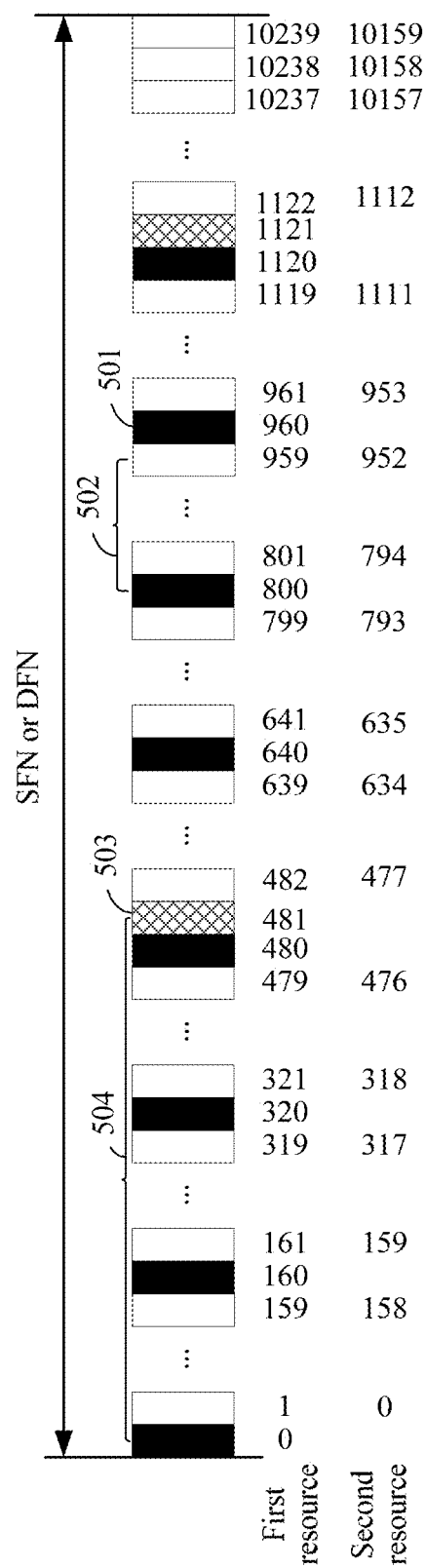
FIG. 5 is a schematic diagram of a resource configuration according to an embodiment of the present invention.

As shown in FIG. 5, 501 indicates a synchronization subframe, and 502 indicates a synchronization period. Each synchronization period includes one synchronization subframe. Herein, 503 indicates a reserved subframe, and every four synchronization periods include one reserved subframe. Herein, 504 indicates that an offset subframe of the reserved subframe relative to a start synchronization subframe in every four synchronization periods is 481. In an optional embodiment, the offset subframe of the reserved subframe relative to the start synchronization subframe in every four synchronization periods may alternatively be another case, and is determined based on the offset information of the reserved subframe.

In an optional embodiment, in the foregoing examples, the configuration information of the reserved resource includes the offset information of the reserved subframe. An offset (or a subframe deviation) of a time domain location of a reserved subframe in each synchronization period relative to a time domain location of a synchronization subframe may be sent by the base station, fixed, or preconfigured.

In an optional embodiment, in the foregoing several examples, according to the resource configuration method provided in this embodiment of the present invention, the reserved subframes may be distributed in the synchronization periods, and the location of the reserved subframe relative to the location of the synchronization subframe is fixed or configurable, so that the terminal device can determine the location of the reserved subframe based on the location information of the synchronization subframe.

Embodiment 2

Specifically, a fixed time domain period may be set. After obtaining information of the fixed time domain period, the terminal device may determine a location of a reserved subframe based on the time domain period and a quantity of subframes included in a first resource. In an optional embodiment, an LTE-V service has a periodic feature. Therefore, the location of the reserved subframe may be bound to a period of the LTE-V service, and the time domain period may be set to a service period, so that the terminal device can determine the location of the reserved subframe based on the service period.

In a specific embodiment, the terminal device obtains a service period configuration of a system. The service period configuration of the system may be set to a fixed time domain period. The service period configuration may be sent by a base station or preconfigured. The terminal device obtains a quantity of reserved subframes. That the terminal device determines the location of the reserved subframe based on the service period (the fixed time domain period) is specifically as follows:

In an example, the terminal device obtains a fourth divisor $C_4$ by dividing the quantity of subframes included in the first resource by the quantity of reserved subframes and then dividing an obtained quotient by the time domain period, where $C_4$ is an integer greater than zero. The terminal device determines a subframe deviation between two adjacent reserved subframes based on $C_4$ and the time domain period. The terminal device determines a time domain location of the reserved subframe in the first resource based on the subframe deviation between the two adjacent reserved subframes, an offset of the reserved subframe, and the quantity of reserved subframes.

Figure 6:
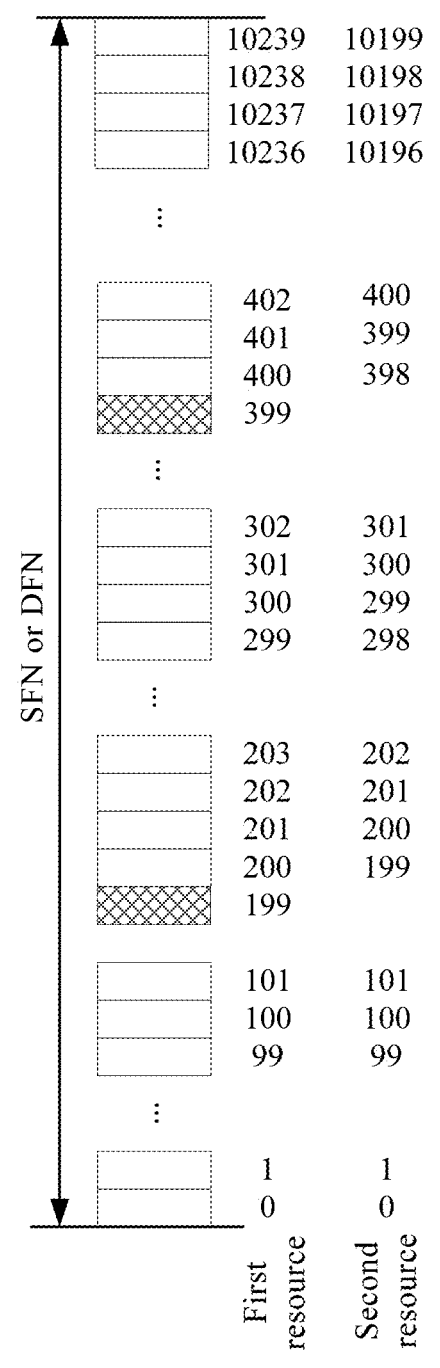

Optionally, if the service period of an LTE-V system is P=100 ms, the time domain period is set to 100 ms. For example 1 in table 1, the quantity Q of reserved subframes in the system is 40, $C_4=\lfloor 10240/(Q*100)\rfloor$. In this case, the fourth divisor $C_4=2$. A subframe deviation determined based on the fourth divisor and the fixed period of 100 ms is $G_1=C_4*100$. Therefore, a finally determined subframe deviation between two adjacent reserved subframes is 200 ms. For details, refer to FIG. 6. In this case, every 200 ms from a first time domain period may include one reserved subframe, and a deviation location of the reserved subframe within each time domain period may be sent by the base station, fixed, or preconfigured. Further, the specific time domain location of the reserved subframe is determined based on the offset of the reserved subframe. Herein, the offset of the reserved subframe is an offset of a start reserved subframe relative to a start subframe of the first resource.

In addition, if the location of the reserved subframe overlaps with the location of the synchronization subframe, the reserved subframe is moved forward or backward at least one subframe.

Optionally, when the quantity of synchronization subframes is not zero, and when the time domain location of the reserved subframe overlaps with a time domain location of a first synchronization subframe, the terminal device determines a time domain location of the reserved subframe at a distance of N subframes from the first synchronization subframe, where N is an integer greater than or equal to 1.

In an optional embodiment, in the foregoing examples, according to the resource configuration method provided in this embodiment of the present invention, the reserved subframe may be distributed in the first resource based on the synchronization period, and the location of the reserved subframe in each time domain period is fixed or configurable, so that the terminal device can determine the location of the reserved subframe based on the time domain period information.

Embodiment 3

Specifically, reserved subframes may be uniformly distributed in a first resource, so that a terminal device can determine a location of a reserved subframe based on a quantity of reserved subframes and a quantity of subframes included in the first resource.

In a specific embodiment, the terminal device obtains the quantity of reserved subframes. That the terminal device determines the location of the reserved subframe when the reserved subframes are uniformly distributed in a period of the first resource is specifically as follows:

In an example, the terminal device obtains a fifth divisor $C_5$ by dividing the quantity of subframes included in the first resource by the quantity of reserved subframes, where $C_5$ is an integer greater than zero. The terminal device determines a subframe deviation between two adjacent reserved subframes based on $C_5$. The terminal device determines the time domain location of the reserved subframe in the first resource based on the subframe deviation between the two adjacent reserved subframes, the offset of the reserved subframe, and the quantity of reserved subframes.

Specifically, if Q reserved subframes are required in a system, the location of the reserved subframe is $C_5=\lfloor 10240/Q \rfloor$. To be specific, every $C_5$ subframes include one reserved subframe. Further, a specific time domain location of the reserved subframe is determined based on an offset of the reserved subframe. Herein, the offset of the reserved subframe is an offset of a start reserved subframe relative to a start subframe of the first resource. If the location of the reserved subframe overlaps with a location of a synchronization subframe, the reserved subframe is moved forward or backward at least one subframe.

Optionally, when a quantity of synchronization subframes is not zero, and when the time domain location of the reserved subframe overlaps with a time domain location of a first synchronization subframe, the terminal device determines a time domain location of the reserved subframe at a distance of N subframes from the first synchronization subframe, where N is an integer greater than or equal to 1.

The reserved subframes are uniformly distributed in radio frame periods of the system. To be specific, every $\lfloor 10240/Q \rfloor$ subframes from a first subframe within a first resource range include one reserved subframe.

In an optional embodiment, configuration information of the reserved subframe includes offset information of the reserved subframe in a synchronization period, offset information of the reserved subframe relative to a start subframe of the first resource in a time domain period interval, or offset information of reserved subframes relative to the start subframe of the first resource, where the reserved subframes are uniformly distributed in the first resource. In addition, the offset information of the reserved subframe may further include information such as offset information when the reserved subframe overlaps with the synchronization subframe, and offset information when the reserved subframe overlaps with a downlink subframe or a special subframe.

In an optional embodiment, in the foregoing examples, according to the resource configuration method provided in this embodiment of the present invention, the reserved subframes may be uniformly distributed in the first resource, so that the terminal device can determine the location of the reserved subframe based on the quantity information of reserved subframes.

According to the resource configuration method provided in this embodiment of the present invention, with reference to the foregoing embodiment shown in FIG. 4 and the technical solutions provided in Embodiment 1, Embodiment 2, and Embodiment 3, the terminal device can determine the location of the reserved subframe based on the location of the synchronization subframe, or determine the location of the reserved subframe based on the service period or the fixed time domain period, or determine the location of the reserved subframe according to a uniform distribution principle. Further, the terminal device can accurately transmit data by using the LTE-V resource pool based on the bitmap.

Figure 7:
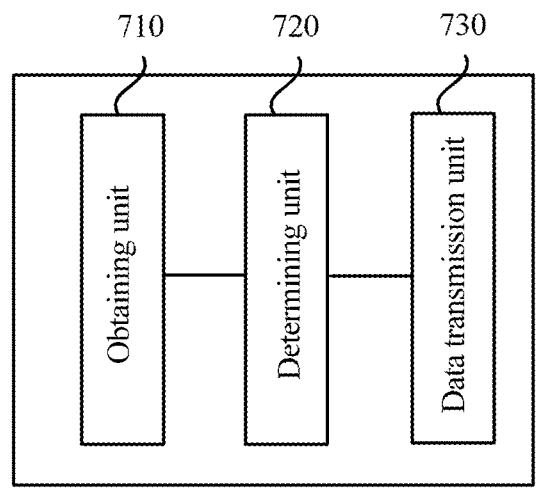
FIG. 7 is an architectural diagram of a terminal device according to an embodiment of the present invention.

Based on the method described in the foregoing embodiments, the terminal device can determine a location of a reserved subframe, and can accurately transmit data by using an LTE-V resource pool based on a bitmap. Correspondingly, an embodiment of the present invention provides a terminal device, to implement the resource configuration method provided in the foregoing embodiments, specific Embodiment 1, Embodiment 2, and Embodiment 3. As shown in FIG. 7, the terminal device includes an obtaining unit 710, a determining unit 720, and a data transmission unit 730.

The obtaining unit 710 of the terminal device is configured to obtain at least one of configuration information of a first resource, configuration information of at least one set of synchronization resources, time domain period information, bitmap information, configuration information of a reserved resource, and configuration information of a time division duplex TDD system, where the first resource is a set of at least one subframe, the synchronization resource includes at least one synchronization subframe, the TDD system includes a downlink subframe and a special subframe, the reserved resource includes at least one reserved subframe, and the synchronization subframe, the reserved subframe, the downlink subframe, and the special subframe are not used for D2D data transmission performed by the terminal device.

The determining unit 720 is configured to determine a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system.

The determining unit 720 is further configured to determine a second resource based on at least one of the configuration information of the first resource, the configuration information of the at least one set of synchronization resources, the configuration information of the TDD system, the quantity information of reserved subframes, and the time domain location information of the reserved subframe in the first resource, where the second resource is a set of candidate subframes for the D2D data transmission performed by the terminal device.

The data transmission unit 730 is configured to perform the D2D data transmission based on the bitmap information and the second resource. In an optional embodiment, the data transmission unit 730 is a sending unit or a receiving unit. The sending unit is configured to send D2D data based on the bitmap information and the second resource, or the receiving unit is configured to receive D2D data based on the bitmap information and the second resource.

Optionally, the configuration information of the at least one set of synchronization resources includes synchronization period information and offset information of a start synchronization subframe in each set of synchronization resources. The configuration information of the first resource is quantity information of subframes included in the first resource. The bitmap information includes bitmap length information.

Optionally, the determining unit 720 is specifically configured to determine at least one of a quantity of synchronization subframes included in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes included in the first resource, the configuration information of the TDD system, the synchronization period information, and the offset information of the start synchronization subframe in each set of synchronization resources in the at least one set of synchronization resources.

Optionally, the determining unit 720 is specifically configured to determine the quantity of reserved subframes based on the configuration information of the reserved subframe, or the determining unit 720 is specifically configured to determine the quantity of reserved subframes based on at least one of quantity information of synchronization subframes in the first resource, the quantity information of downlink subframes, and the quantity information of special subframes, the quantity information of subframes included in the first resource, and the bitmap length information.

Optionally, the determining unit 720 is specifically configured to determine the time domain location of the reserved subframe in the first resource based on at least one of the quantity information of subframes included in the first resource, the quantity information of synchronization subframes included in each set of synchronization resources in the first resource, the quantity information of reserved subframes, the time domain period information, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

Optionally, the configuration information of the reserved resource includes offset information of the reserved subframe.

Optionally, the determining unit 720 is specifically configured to: when the quantity of synchronization subframes is not zero, and when the quantity of synchronization subframes included in each set of synchronization resources is less than or equal to the quantity of reserved subframes, obtain a first divisor $C_1$ and a remainder Y by dividing the quantity of reserved subframes by the quantity of synchronization subframes included in each set of synchronization resources, where $C_1$ is an integer greater than zero, Y is an integer greater than zero, and Y is less than the quantity of synchronization subframes included in each set of synchronization resources; determine that each synchronization period includes $C_1$ reserved subframes, where first Y synchronization periods each further include one reserved subframe; and determine the time domain location of the reserved subframe in the first resource based on the offset of the reserved subframe.

Optionally, the determining unit 720 is specifically configured to: when the quantity of synchronization subframes is not zero, and when the quantity of synchronization subframes included in each set of synchronization resources is less than or equal to the quantity of reserved subframes, obtain $C_1$ and Y by dividing the quantity of reserved subframes by the quantity of synchronization subframes included in each set of synchronization resources; obtain a second divisor $C_2$ by dividing the quantity of synchronization subframes included in each set of synchronization resources by Y, where $C_2$ is an integer greater than zero; determine that each synchronization period includes $C_1$ reserved subframes, where every $C_2$ synchronization periods further include one reserved subframe; and determine the time domain location of the reserved subframe in the first resource based on the offset information of the reserved subframe.

Each synchronization period includes one synchronization subframe of each set of synchronization resources. A time domain location of a reserved subframe does not overlap with a time domain location of a synchronization subframe. If one synchronization period includes more than one reserved subframe, time domain locations of the more than one reserved subframe do not overlap.

Optionally, the determining unit 720 is specifically configured to: when the quantity of synchronization subframes is not zero, and when the quantity of synchronization subframes included in each set of synchronization resources is greater than the quantity of reserved subframes, obtain a third divisor $C_3$ by dividing the quantity of synchronization subframes included in each set of synchronization resources by the quantity of reserved subframes, where $C_3$ is an integer greater than zero; determine that every $C_3$ synchronization periods include one reserved subframe; and determine the time domain location of the reserved subframe in the first resource based on the offset information of the reserved subframe.

Each synchronization period includes one synchronization subframe of each set of synchronization resources. A time domain location of a reserved subframe does not overlap with a time domain location of a synchronization subframe.

Optionally, the determining unit 720 is specifically configured to: obtain a fourth divisor $C_4$ by dividing the quantity of subframes included in the first resource by the quantity of reserved subframes and then dividing an obtained quotient by the time domain period, where $C_4$ is an integer greater than zero; determine a subframe deviation between two adjacent reserved subframes based on $C_4$ and the time domain period; and determine the time domain location of the reserved subframe in the first resource based on the subframe deviation between the two adjacent reserved subframes, the offset of the reserved subframe, and the quantity of reserved subframes.

Optionally, the determining unit 720 is specifically configured to: obtain a fifth divisor $C_5$ by dividing the quantity of subframes included in the first resource by the quantity of reserved subframes, where $C_5$ is an integer greater than zero; determine a subframe deviation between two adjacent reserved subframes based on $C_5$; and determine the time domain location of the reserved subframe in the first resource based on the subframe deviation between the two adjacent reserved subframes, the offset of the reserved subframe, and the quantity of reserved subframes.

Optionally, the determining unit 720 is specifically configured to: when the quantity of synchronization subframes is not zero, and when the time domain location of the reserved subframe overlaps with a time domain location of a first synchronization subframe, determine a time domain location of the reserved subframe at a distance of N subframes from the first synchronization subframe, where N is an integer greater than or equal to 1.

Optionally, the determining unit 720 is specifically configured to: when the quantity of downlink subframes is not zero, and when the time domain location of the reserved subframe overlaps with a time domain location of a first downlink subframe, determine a time domain location of the reserved subframe at a distance of M subframes from the first downlink subframe, where M is an integer greater than or equal to 1.

Optionally, the determining unit 720 is specifically configured to: when the quantity of special subframes is not zero, and when the time domain location of the reserved subframe overlaps with a time domain location of a first special subframe, determine a time domain location of the reserved subframe at a distance of S subframes from the first special subframe, where S is an integer greater than or equal to 1.

Optionally, the determining unit 720 is further specifically configured to determine the second resource based on at least one of the quantity information of subframes included in the first resource, the quantity information of synchronization subframes included in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

Optionally, the at least one of the configuration information of the first resource, the configuration information of the at least one set of synchronization resources, the time domain period information, the bitmap information, the configuration information of the reserved resource, and the configuration information of the TDD system is information received from a base station or preconfigured information.

Figure 8:
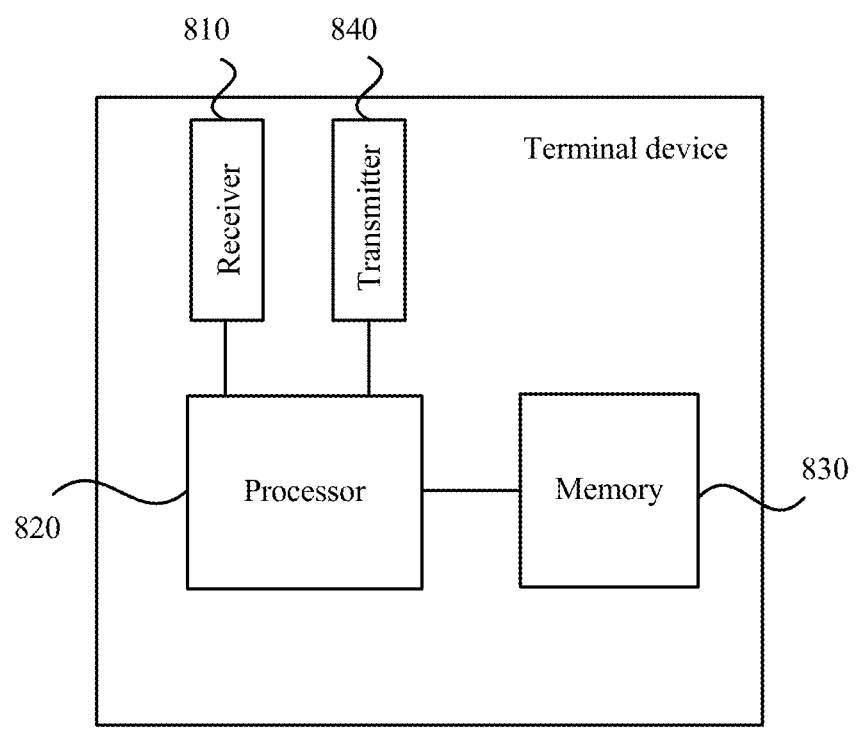
FIG. 8 is an architectural diagram of another terminal device according to an embodiment of the present invention.

In addition, a terminal device provided in an embodiment of the present invention may further use the following implementation, to implement the communication method in the foregoing embodiments of the present invention. As shown in FIG. 8, the terminal device includes a receiver 810, a processor 820, a memory 830, and a transmitter 840.

In an optional embodiment, the obtaining unit 710 in the embodiment described in the foregoing FIG. 7 may be replaced with the receiver 810 or the memory 830. Specifically, the at least one of the configuration information of the first resource, the configuration information of the at least one set of synchronization resources, the time domain period information, the bitmap information, the configuration information of the reserved resource, and the configuration information of the TDD system is information received by the receiver 810 from a base station or preconfigured information in the memory 830.

The determining unit 720 may be replaced with the processor 820. The data transmission unit 730 may be replaced with the receiver 810 or the transmitter 840.

For a processing procedure of each unit in FIG. 8, refer to the specific embodiments shown in FIG. 3 to FIG. 7. Details are not described herein again.

Figure 9:
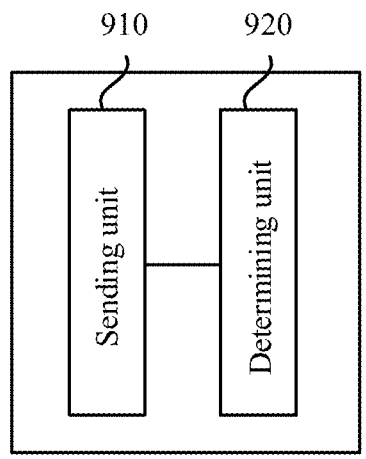
FIG. 9 is an architectural diagram of a base station according to an embodiment of the present invention.

Correspondingly, an embodiment of the present invention further provides a base station, to implement the resource configuration method provided in the foregoing embodiments, specific Embodiment 1, Embodiment 2, and Embodiment 3. As shown in FIG. 9, the base station includes a sending unit 910 and a determining unit 920.

The sending unit 910 of the base station is configured to send at least one of configuration information of a first resource, configuration information of at least one set of synchronization resources, time domain period information, bitmap information, configuration information of a reserved resource, and configuration information of a time division duplex TDD system to a terminal device, where the at least one of the configuration information of the first resource, the configuration information of the at least one set of synchronization resources, the time domain period information, the bitmap information, the configuration information of the reserved resource, and the configuration information of the TDD system is used by the terminal device to determine a quantity of reserved subframes in the first resource and a time domain location of the reserved subframe in the first resource based on the at least one of the configuration information of the first resource, the configuration information of the at least one set of synchronization resources, the time domain period information, the bitmap information, the configuration information of the reserved resource, and the configuration information of the TDD system, and at least one of the configuration information of the first resource, the configuration information of the at least one set of synchronization resources, the configuration information of the TDD system, the quantity information of reserved subframes, and the time domain location information of the reserved subframe in the first resource is used by the terminal device to determine a second resource based on the at least one of the configuration information of the first resource, the configuration information of the at least one set of synchronization resources, the configuration information of the TDD system, the quantity information of reserved subframes, and the time domain location information of the reserved subframe in the first resource.

The first resource is a set of at least one subframe. The synchronization resource includes at least one synchronization subframe. The TDD system includes a downlink subframe and a special subframe. The reserved resource includes at least one reserved subframe. The synchronization subframe, the reserved subframe, the downlink subframe, and the special subframe are not used for device-to-device D2D data transmission performed by the terminal device. The second resource is a set of candidate subframes for the D2D data transmission performed by the terminal device.

Optionally, the bitmap information includes bitmap length information.

Figure 10:
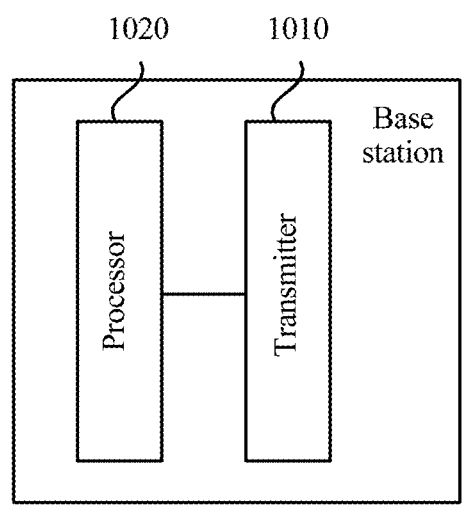
FIG. 10 is an architectural diagram of another base station according to an embodiment of the present invention.

Optionally, if the base station sends the configuration information of the reserved resource to the terminal device, and the configuration information of the reserved resource includes the quantity information of reserved subframes, the determining unit 920 of the base station is configured to determine the quantity of reserved subframes, so that the quantity of candidate subframes can be exactly divided by the bitmap length. In addition, a base station provided in an embodiment of the present invention may further use the following implementation, to implement the resource configuration method in the foregoing embodiments of the present invention, specific Embodiment 1, Embodiment 2, and Embodiment 3. As shown in FIG. 10, the base station includes a transmitter 1010 and a processor 1020.

In an optional embodiment, the sending unit 910 in the embodiment described in the foregoing FIG. 9 may be replaced with the transmitter 1010, and the determining unit 920 may be replaced with the processor 1020. For a processing procedure of each unit in FIG. 10, refer to the specific embodiments shown in FIG. 9. Details are not described herein again.

According to the resource configuration method, the terminal device, and the base station provided in the embodiments of the present invention, the terminal device can determine the quantity of reserved subframes based on the information sent by the base station or the preconfigured information. Further, the location of the reserved subframe is determined based on the location of the synchronization subframe, or the location of the reserved subframe is determined based on a service period or a fixed time domain period, or the location of the reserved subframe is determined according to the uniform distribution principle. Further, the terminal device can accurately perform D2D data transmission by using the LTE-V resource pool based on the bitmap. In addition, when the information sent by the base station or the preconfigured information includes the configuration information of the TDD system, when determining the quantity of reserved subframes, the terminal device excludes the downlink subframe and the special subframe that are included in the TDD system; and when finally determining the LTE-V resource pool, the terminal device also excludes the downlink subframe and the special subframe, and accurately performs the D2D data transmission by using the LTE-V resource pool based on the bitmap.

It should be noted that the resource configuration method, the terminal device, and the base station provided in the embodiments of the present invention are not only applicable to LTE-V and the field of D2D data transmission in LTE-V, but also applicable to other situations. A person skilled in the art may understand that the terminal device determines the quantity of reserved resources and the time domain location of the reserved resource according to a rule sent by the base station or a preconfigured rule, so that the quantity of subframes included in the resource pool can be exactly divided by the bitmap length. In this way, the bitmap can be repeated in a subframe range included in the resource pool, so that all subframes in the resource pool are indicated by using bits in the bitmap. This implementation shall fall within the protection scope of the embodiments of the present invention.

A person skilled in the art may be further aware that units and algorithm steps of examples described with reference to the embodiments disclosed in this specification may be implemented by using electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

A person of ordinary skill in the art may understand that all or some of the steps in the foregoing method in the embodiments may be implemented by a program instructing a processor. The program may be stored in a computer readable storage medium. The storage medium may be a non-transitory medium, such as a random-access memory, a read-only memory, a flash memory, a hard disk, a solid state drive, a magnetic tape, a floppy disk, an optical disc, or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource configuration method, wherein the method comprises:
    obtaining, by a terminal device, configuration information of a first resource, configuration information of at least one set of synchronization resources, bitmap information, and configuration information of a time division duplex (TDD) system, wherein
        the first resource is a set of at least one subframe, the synchronization resource comprises at least one synchronization subframe,
        the TDD system comprises a downlink subframe and a special subframe,
        the reserved resource comprises at least one reserved subframe, and
        the synchronization subframe, the reserved subframe, the downlink subframe, and the special subframe are not used for device-to-device (D2D) data transmission performed by the terminal device;
    determining, by the terminal device, a quantity of reserved subframes in the first resource and a time domain location of the reserved subframe in the first resource based on the configuration information of the first resource, the configuration information of the at least one set of synchronization resources, the bitmap information, and the configuration information of the TDD system;
    determining, by the terminal device, a second resource based on at least one of the configuration information of the first resource, the configuration information of the at least one set of synchronization resources, the configuration information of the TDD system, the quantity information of reserved subframes, and the time domain location information of the reserved subframe in the first resource, wherein the second resource is a set of candidate subframes for the D2D data transmission performed by the terminal device; and
    performing, by the terminal device, the D2D data transmission based on the bitmap information and the second resource.

2. The resource configuration method according to claim 1, wherein the configuration information of the at least one set of synchronization resources comprises synchronization period information and offset information of a start synchronization subframe in each set of synchronization resources;
    the configuration information of the first resource is quantity information of subframes comprised in the first resource;
    the bitmap information comprises bitmap length information; and, wherein
    determining, by the terminal device, the quantity of reserved subframes in the first resource and the time domain location of the reserved subframe in the first resource based on the at least one of the configuration information of the first resource, the configuration information of the at least one set of synchronization resources, the bitmap information, and the configuration information of the TDD system comprises:
    determining, by the terminal device, at least one of a quantity of synchronization subframes comprised in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes comprised in the first resource, the configuration information of the TDD system, the synchronization period information, and the offset information of the start synchronization subframe in each set of synchronization resources in the at least one set of synchronization resources;
    determining, by the terminal device, the quantity of reserved subframes based on the configuration information of the reserved subframe, or determining, by the terminal device, the quantity of reserved subframes based on at least one of quantity information of synchronization subframes in the first resource, the quantity information of downlink subframes, and the quantity information of special subframes, the quantity information of subframes comprised in the first resource, and the bitmap length information; and
    determining, by the terminal device, the time domain location of the reserved subframe in the first resource based on at least one of the quantity information of subframes comprised in the first resource, the quantity information of synchronization subframes comprised in each set of synchronization resources in the first resource, the quantity information of reserved subframes, the time domain period information, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

3. The resource configuration method according to claim 2, wherein determining, by the terminal device, the time domain location of the reserved subframe in the first resource based on at least one of the quantity information of subframes comprised in the first resource, the quantity information of synchronization subframes comprised in each set of synchronization resources in the first resource, the quantity information of reserved subframes, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource comprises:

when the quantity of synchronization subframes is not zero, and when the quantity of synchronization subframes comprised in each set of synchronization resources is less than or equal to the quantity of reserved subframes, obtaining, by the terminal device, a first quotient $C_1$ and a remainder Y by dividing the quantity of reserved subframes by the quantity of synchronization subframes comprised in each set of synchronization resources, wherein $C_1$ is an integer greater than zero, Y is an integer greater than zero, and Y is less than the quantity of synchronization subframes comprised in each set of synchronization resources; and determining, by the terminal device, that each synchronization period comprises $C_1$ reserved subframes, wherein first Y synchronization periods each further comprise one reserved subframe, wherein each synchronization period comprises one synchronization subframe of each set of synchronization resources, a time domain location of a reserved subframe does not overlap with a time domain location of a synchronization subframe, and if one synchronization period comprises more than one reserved subframe, time domain locations of the more than one reserved subframe do not overlap.

4. The resource configuration method according to claim 2, wherein determining, by the terminal device, the time domain location of the reserved subframe in the first resource based on at least one of the quantity information of subframes comprised in the first resource, the quantity information of synchronization subframes comprised in each set of synchronization resources in the first resource, the quantity information of reserved subframes, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource comprises:

when the quantity of synchronization subframes is not zero, and when the quantity of synchronization subframes comprised in each set of synchronization resources is less than or equal to the quantity of reserved subframes, obtaining, by the terminal device, $C_1$ and Y by dividing the quantity of reserved subframes by the quantity of synchronization subframes comprised in each set of synchronization resources;

obtaining, by the terminal device, a second divisor $C_2$ by dividing the quantity of synchronization subframes comprised in each set of synchronization resources by Y, wherein $C_2$ is an integer greater than zero; and determining, by the terminal device, that each synchronization period comprises $C_1$ reserved subframes, wherein every $C_2$ synchronization periods further comprise one reserved subframe, wherein each synchronization period comprises one synchronization subframe of each set of synchronization resources, a time domain location of a reserved subframe does not overlap with a time domain location of a synchronization subframe, and if one synchronization period comprises more than one reserved subframe, time domain locations of the more than one reserved subframe do not overlap.

5. The resource configuration method according to claim 2, wherein determining, by the terminal device, the time domain location of the reserved subframe in the first resource based on at least one of the quantity information of subframes comprised in the first resource, the quantity information of synchronization subframes comprised in each set of synchronization resources in the first resource, the quantity information of reserved subframes the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource comprises:

when the quantity of synchronization subframes is not zero, and when the quantity of synchronization subframes comprised in each set of synchronization resources is greater than the quantity of reserved subframes, obtaining, by the terminal device, a third divisor $C_3$ by dividing the quantity of synchronization subframes comprised in each set of synchronization resources by the quantity of reserved subframes, wherein $C_3$ is an integer greater than zero; and determining, by the terminal device, that every $C_3$ synchronization periods comprise one reserved subframe, wherein each synchronization period comprises one synchronization subframe of each set of synchronization resources, and a time domain location of a reserved subframe does not overlap with a time domain location of a synchronization subframe.

6. The resource configuration method according to claim 2, wherein determining, by the terminal device, the time domain location of the reserved subframe in the first resource based on at least one of the quantity information of subframes comprised in the first resource, the quantity information of synchronization subframes comprised in each set of synchronization resources in the first resource, the quantity information of reserved subframes, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource comprises:

obtaining, by the terminal device, a fourth divisor $C_4$ by dividing the quantity of subframes comprised in the first resource by the quantity of reserved subframes and then dividing an obtained quotient, wherein $C_4$ is an integer greater than zero;

determining, by the terminal device, a subframe deviation between two adjacent reserved subframes based on $C_4$ and the time domain period; and determining, by the terminal device, the time domain location of the reserved subframe in the first resource based on the subframe deviation between the two adjacent reserved subframes, and the quantity of reserved subframes.

7. The resource configuration method according to claim 3, wherein when the quantity of downlink subframes is not zero, and when the time domain location of the reserved subframe overlaps with a time domain location of a first downlink subframe, the terminal device determines a time domain location of the reserved subframe at a distance of M subframes from the first downlink subframe, wherein M is an integer greater than or equal to 1.

8. The resource configuration method according to claim 2, wherein the determining, by the terminal device, a second resource based on at least one of the configuration information of the first resource, the configuration information of the at least one set of synchronization resources, the configuration information of the TDD system, the quantity information of reserved subframes, and the time domain location information of the reserved subframe in the first resource comprises:
determining, by the terminal device, the second resource based on at least one of the quantity information of subframes comprised in the first resource, the quantity information of synchronization subframes comprised in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

9. The resource configuration method according to claim 1, wherein the at least one of the configuration information of the first resource, the configuration information of the at least one set of synchronization resources, the bitmap information, and the configuration information of the TDD system is information received from a base station or preconfigured information.

10. A resource configuration method, wherein the method comprises:
sending, by a base station, configuration information of a first resource, configuration information of at least one set of synchronization resources, bitmap information, and configuration information of a time division duplex (TDD) system to a terminal device, wherein the at least one of the configuration information of the first resource, the configuration information of the at least one set of synchronization resources, the bitmap information, and the configuration information of the TDD system is used by the terminal device to determine a quantity of reserved subframes in the first resource and a time domain location of the reserved subframe in the first resource based on the configuration information of the first resource, the configuration information of the at least one set of synchronization resources, the bitmap information, and the configuration information of the TDD system, and at least one of the configuration information of the first resource, the configuration information of the at least one set of synchronization resources, the configuration information of the TDD system, the quantity information of reserved subframes, and the time domain location information of the reserved subframe in the first resource is used by the terminal device to determine a second resource based on the at least one of the configuration information of the first resource, the configuration information of the at least one set of synchronization resources, the configuration information of the TDD system, the quantity information of reserved subframes, and the time domain location information of the reserved subframe in the first resource, wherein the first resource is a set of at least one subframe, the synchronization resource comprises at least one synchronization subframe, the TDD system comprises a downlink subframe and a special subframe, the reserved resource comprises at least one reserved subframe, the synchronization subframe, the reserved subframe, the downlink subframe, and the special subframe are not used for device-to-device (D2D) data transmission performed by the terminal device, and the second resource is a set of candidate subframes for the D2D data transmission performed by the terminal device.

11. The method according to claim 10, wherein the bitmap information comprises bitmap length information; and
if the base station sends the configuration information of the reserved resource to the terminal device, and the configuration information of the reserved resource comprises the quantity information of reserved subframes, the quantity of reserved subframes enables exact division of a quantity of candidate subframes by the bitmap length.

12. A terminal device, wherein the terminal device comprises:
an obtaining unit, configured to obtain configuration information of a first resource, configuration information of at least one set of synchronization resources, bitmap information, and configuration information of a time division duplex (TDD) system, wherein the first resource is a set of at least one subframe, the synchronization resource comprises at least one synchronization subframe, the TDD system comprises a downlink subframe and a special subframe, the reserved resource comprises at least one reserved subframe, and the synchronization subframe, the reserved subframe, the downlink subframe, and the special subframe are not used for device-to-device (D2D) data transmission performed by the terminal device;
a determining unit, configured to determine a quantity of reserved subframes in the first resource and a time domain location of the reserved subframe in the first resource based on the configuration information of the first resource, the configuration information of the at least one set of synchronization resources, the bitmap information, and the configuration information of the TDD system, wherein
the determining unit is further configured to determine a second resource based on at least one of the configuration information of the first resource, the configuration information of the at least one set of synchronization resources, the configuration information of the TDD system, the quantity information of reserved subframes, and the time domain location information of the reserved subframe in the first resource, wherein the second resource is a set of candidate subframes for the D2D data transmission performed by the terminal device; and a data transmission unit, configured to perform the D2D data transmission based on the bitmap information and the second resource.

13. The terminal device according to claim 12, wherein the configuration information of the at least one set of synchronization resources comprises synchronization period information and offset information of a start synchronization subframe in each set of synchronization resources;
the configuration information of the first resource is quantity information of subframes comprised in the first resource;
the bitmap information comprises bitmap length information;
the determining unit is configured to determine at least one of a quantity of synchronization subframes comprised in each set of synchronization resources in the first resource, a time domain location of the synchronization subframe in the first resource, a quantity of downlink subframes, a quantity of special subframes, a time domain location of the downlink subframe in the first resource, and a time domain location of the special subframe in the first resource based on at least one of the quantity information of subframes comprised in the first resource, the configuration information of the TDD system, the synchronization period information, and the offset information of the start synchronization subframe in each set of synchronization resources in the at least one set of synchronization resources;
the determining unit is specifically configured to determine the quantity of reserved subframes based on the configuration information of the reserved subframe, or the determining unit is specifically configured to determine the quantity of reserved subframes based on at least one of quantity information of synchronization subframes in the first resource, the quantity information of downlink subframes, and the quantity information of special subframes, the quantity information of subframes comprised in the first resource, and the bitmap length information; and
the determining unit is specifically configured to determine the time domain location of the reserved subframe in the first resource based on at least one of the quantity information of subframes comprised in the first resource, the quantity information of synchronization subframes comprised in each set of synchronization resources in the first resource, the quantity information of reserved subframes, the time domain location information of the synchronization subframe in the first resource, the configuration information of the reserved subframe, the quantity information of downlink subframes, the quantity information of special subframes, the time domain location information of the downlink subframe in the first resource, and the time domain location information of the special subframe in the first resource.

14. The terminal device according to claim 13, wherein determining unit is configured to: when the quantity of synchronization subframes is not zero, and when the quantity of synchronization subframes comprised in each set of synchronization resources is less than or equal to the quantity of reserved subframes, obtain a first divisor $C_1$ and a remainder Y by dividing the quantity of reserved subframes by the quantity of synchronization subframes comprised in each set of synchronization resources, wherein $C_1$ is an integer greater than zero, Y is an integer greater than zero, and Y is less than the quantity of synchronization subframes comprised in each set of synchronization resources; and determine that each synchronization period comprises $C_1$ reserved subframes, wherein first Y synchronization periods each further comprise one reserved subframe, each synchronization period comprises one synchronization subframe of each set of synchronization resources, a time domain location of a reserved subframe does not overlap with a time domain location of a synchronization subframe, and if one synchronization period comprises more than one reserved subframe, time domain locations of the more than one reserved subframe do not overlap.

15. The terminal device according to claim 13, wherein the determining unit is configured to: when the quantity of synchronization subframes is not zero, and when the quantity of synchronization subframes comprised in each set of synchronization resources is less than or equal to the quantity of reserved subframes, obtain $C_1$ and Y by dividing the quantity of reserved subframes by the quantity of synchronization subframes comprised in each set of synchronization resources; obtain a second divisor $C_2$ by dividing the quantity of synchronization subframes comprised in each set of synchronization resources by Y, wherein $C_2$ is an integer greater than zero; and determine that each synchronization period comprises $C_1$ reserved subframes, wherein every $C_2$ synchronization periods further comprise one reserved subframe, each synchronization period comprises one synchronization subframe of each set of synchronization resources, a time domain location of a reserved subframe does not overlap with a time domain location of a synchronization subframe, and if one synchronization period comprises more than one reserved subframe, time domain locations of the more than one reserved subframe do not overlap.

16. The terminal device according to claim 14, wherein the determining unit is specifically configured to: when the quantity of downlink subframes is not zero, and when the time domain location of the reserved subframe overlaps with a time domain location of a first downlink subframe, determine, a time domain location of the reserved subframe at a distance of M subframes from the first downlink subframe, wherein M is an integer greater than or equal to 1.

17. The terminal device according to claim 13, wherein the determining unit is further specifically configured to determine the second resource based on at least one of the quantity information of subframes comprised in the first resource, the quantity information of synchronization subframes comprised in each set of synchronization resources in the first resource, the time domain location information of the synchronization subframe in the first resource, the quantity information of reserved subframes, the time domain location information of the reserved subframe in the first resource, the quantity information of downlink subframes, the quantity information of special subframes, the time domain location information of the downlink subframe in the first resource, and the time domain location information of the special subframe in the first resource.

18. The terminal device according to claim 12, wherein the at least one of the configuration information of the first resource, the configuration information of the at least one set of synchronization resources, the bitmap information, the configuration information of the reserved resource, and the configuration information of the TDD system is information received from a base station or preconfigured information.

19. A base station, wherein the base station comprises:
a sending unit, configured to send configuration information of a first resource, configuration information of at least one set of synchronization resources, bitmap information, and configuration information of a time division duplex (TDD) system to a terminal device, wherein the at least one of the configuration information of the first resource, the configuration information of the at least one set of synchronization resources, the bitmap information, the configuration information of the reserved resource, and the configuration information of the TDD system is used by the terminal device to determine a quantity of reserved subframes in the first resource and a time domain location of the reserved subframe in the first resource based on the configuration information of the first resource, the configuration information of the at least one set of synchronization resources, the bitmap information, and the configuration information of the TDD system, and at least one of the configuration information of the first resource, the configuration information of the at least one set of synchronization resources, the configuration information of the TDD system, the quantity information of reserved subframes, and the time domain location information of the reserved subframe in the first resource is used by the terminal device to determine a second resource based on the at least one of the configuration information of the first resource, the configuration information of the at least one set of synchronization resources, the configuration information of the TDD system, the quantity information of reserved subframes, and the time domain location information of the reserved subframe in the first resource, wherein the first resource is a set of at least one subframe, the synchronization resource comprises at least one synchronization subframe, the TDD system comprises a downlink subframe and a special subframe, the reserved resource comprises at least one reserved subframe, the synchronization subframe, the reserved subframe, the downlink subframe, and the special subframe are not used for device-to-device (D2D) data transmission performed by the terminal device, and the second resource is a set of candidate subframes for the D2D data transmission performed by the terminal device.

20. The base station according to claim 19, wherein the bitmap information comprises bitmap length information; and if the base station sends the configuration information of the reserved resource to the terminal device, and the configuration information of the reserved resource comprises the quantity information of reserved subframes, the base station further comprises:

a determining unit, configured to determine the quantity of reserved subframes, so that a quantity of candidate subframes is exactly divided by the bitmap length.

* * * * *